US006813059B2

(12) United States Patent
Hunter et al.

(10) Patent No.: US 6,813,059 B2
(45) Date of Patent: Nov. 2, 2004

(54) REDUCED FORMATION OF ASPERITIES IN CONTACT MICRO-STRUCTURES

(75) Inventors: James Hunter, Campbell, CA (US); Bryan Staker, Pleasanton, CA (US)

(73) Assignee: Silicon Light Machines, Inc., Sunnyvale, CA (US)

( * ) Notice: Subject to any disclaimer, the term of this patent is extended or adjusted under 35 U.S.C. 154(b) by 51 days.

(21) Appl. No.: 10/187,159

(22) Filed: Jun. 28, 2002

(65) Prior Publication Data

US 2004/0057101 A1 Mar. 25, 2004

(51) Int. Cl.[7] .............................................. G02B 26/00
(52) U.S. Cl. ........................ 359/290; 359/231; 359/248
(58) Field of Search ................................ 359/290, 231, 359/247, 248, 291, 295, 570, 572, 573, 292, 298, 566

(56) References Cited

U.S. PATENT DOCUMENTS

| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai ........................ 178/5.4 |
| 2,783,406 A | 2/1957 | Vanderhooft ................. 313/70 |
| 2,920,529 A | 1/1960 | Blythe ........................... 88/73 |
| 2,991,690 A | 7/1961 | Grey et al. .................. 88/16.6 |
| RE25,169 E | 5/1962 | Glenn |
| 3,256,465 A | 6/1966 | Weissenstern et al. ...... 317/101 |

(List continued on next page.)

FOREIGN PATENT DOCUMENTS

| DE | 32 33 195 A1 | 3/1983 | ........... H01L/23/52 |
| DE | 43 23 799 A1 | 1/1994 | ........... H01L/23/50 |
| DE | 197 23 618 A1 | 12/1997 | ............. G03F/1/14 |
| DE | 197 51 716 A1 | 5/1998 | ........... G02B/27/14 |
| DE | 198 46 532 C1 | 5/2000 | ........... G02B/27/09 |
| EP | 0 089 044 A2 | 9/1983 | ........... H01L/23/10 |
| EP | 0 261 901 A2 | 3/1988 | ............. G09G/3/36 |
| EP | 0 314 437 A1 | 10/1988 | ........... H01L/25/08 |
| EP | 0 304 263 A2 | 2/1989 | ......... H01L/25/065 |
| EP | 0 306 308 A2 | 3/1989 | ............ H04N/3/14 |

(List continued on next page.)

OTHER PUBLICATIONS

R. Apte, "Grating Light Valves for High Resolution Displays", Solid State Sensors and Actuators Workshop, Ph D. Dissertation, Stanford University (Jun. 1994).
O. Solgaard, "Integrated Semiconductor Light Modulators for Fiber–Optic and Display Applications", Ph.D. Dissertation, Stanford University Feb., 1992.
J. Neff, "Two–Dimensional Spatial Light Modulators: A Tutorial", Proceedings of the IEEE, vol. 78, No. 5 (May 1990), pp 826–855.

(List continued on next page.)

*Primary Examiner*—Georgia Epps
*Assistant Examiner*—Tuyen Tra
(74) *Attorney, Agent, or Firm*—Okamoto & Benedicto LLP

(57) ABSTRACT

A device comprising movable micro-structures configured to contact a substrate is disclosed. The substrate has a metal-insulator-metal construction with an upper metal layer and an insulator being patterned to provide substrate contact regions to a lower metal layer. The micro-structures have metal under layers for providing ribbon contact regions and non-contact regions. In use, a bias voltage is applied across the micro-structures and the top metal layer of the substrate causing the micro-structures and the substrate to contact through the contact regions. During contact, the contact regions are maintained at a potential that is substantially less than the applied bias voltage, thereby reducing the formation of asperities and/or sticking between contacting parts. The micro-structures are preferably ribbon structures in an optical MEM device configured to modulate light.

14 Claims, 11 Drawing Sheets

U.S. PATENT DOCUMENTS

| | | | |
|---|---|---|---|
| 3,388,301 A | 6/1968 | James | 317/234 |
| 3,443,871 A | 5/1969 | Chitayat | 356/106 |
| 3,553,364 A | 1/1971 | Lee | 178/7.3 |
| 3,576,394 A | 4/1971 | Lee | 178/7.3 |
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Sen et al. | 430/2 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 350/161 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/454 |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,257,053 A | 3/1981 | Gilbreath | |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.34 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 348/771 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |

| | | | | | | |
|---|---|---|---|---|---|---|
| 4,649,432 A | 3/1987 | Watanabe .................... 358/241 | | 4,970,575 A | 11/1990 | Soga et al. .................... 357/72 |
| 4,652,932 A | 3/1987 | Miyajima et al. ............. 358/236 | | 4,978,202 A | 12/1990 | Yang ...................... 350/331 R |
| 4,655,539 A | 4/1987 | Caulfield et al. ............. 350/3.6 | | 4,982,184 A | 1/1991 | Kirkwood .................... 340/783 |
| 4,660,938 A | 4/1987 | Kazan ........................ 350/355 | | 4,982,265 A | 1/1991 | Watanabe et al. .............. 357/75 |
| 4,661,828 A | 4/1987 | Miller, Jr. et al. ........... 346/108 | | 4,984,824 A | 1/1991 | Antes et al. ................... 283/91 |
| 4,662,746 A | 5/1987 | Hornbeck .................... 350/269 | | 4,999,308 A | 3/1991 | Nishiura et al. ................ 437/4 |
| 4,663,670 A | 5/1987 | Ito et al. ...................... 358/245 | | 5,003,300 A | 3/1991 | Wells ........................ 340/705 |
| 4,687,326 A | 8/1987 | Corby, Jr. ........................ 356/5 | | 5,009,473 A | 4/1991 | Hunter et al. ................. 350/6.6 |
| 4,698,602 A | 10/1987 | Armitage .................... 259/294 | | 5,013,141 A | 5/1991 | Sakata ........................ 350/348 |
| 4,700,276 A | 10/1987 | Freyman et al. ............. 361/403 | | 5,018,256 A | 5/1991 | Hornbeck .................. 29/25.01 |
| 4,707,064 A | 11/1987 | Dobrowolski et al. ... 350/96.19 | | 5,022,750 A | 6/1991 | Flasck .......................... 353/31 |
| 4,709,995 A | 12/1987 | Kuribayashi et al. ........ 350/350 | | 5,023,905 A | 6/1991 | Wells et al. ................... 379/96 |
| 4,710,732 A | 12/1987 | Hornbeck .................. 332/7.51 | | 5,024,494 A | 6/1991 | Williams et al. .............. 350/3.6 |
| 4,711,526 A | 12/1987 | Hennings et al. ........... 350/170 | | 5,028,939 A | 7/1991 | Hornbeck et al. ........... 346/160 |
| 4,714,326 A | 12/1987 | Usui et al. .................... 350/485 | | 5,031,144 A | 7/1991 | Persky |
| 4,717,066 A | 1/1988 | Goldenberg et al. ........ 228/179 | | 5,035,473 A | 7/1991 | Kuwayama et al. .......... 350/3.7 |
| 4,719,507 A | 1/1988 | Bos ............................. 358/92 | | 5,037,173 A | 8/1991 | Sampsell et al. .............. 385/17 |
| 4,721,629 A | 1/1988 | Sakai et al. .................... 427/35 | | 5,039,628 A | 8/1991 | Carey .......................... 437/183 |
| 4,722,593 A | 2/1988 | Shimazaki .................... 350/336 | | 5,040,052 A | 8/1991 | McDavid ...................... 357/80 |
| 4,724,467 A | 2/1988 | Yip et al. ....................... 355/71 | | 5,041,395 A | 8/1991 | Steffen ........................ 437/206 |
| 4,728,185 A | 3/1988 | Thomas ....................... 353/122 | | 5,041,851 A | 8/1991 | Nelson ........................ 346/160 |
| 4,743,091 A | 5/1988 | Gelbart ........................ 350/252 | | 5,043,917 A | 8/1991 | Okamoto ..................... 364/518 |
| 4,744,633 A | 5/1988 | Sheiman ...................... 350/132 | | 5,048,077 A | 9/1991 | Wells et al. ................... 379/96 |
| 4,747,671 A | 5/1988 | Takahashi et al. .......... 350/336 | | 5,049,901 A | 9/1991 | Gelbart ........................ 346/108 |
| 4,751,509 A | 6/1988 | Kubota et al. ............... 340/784 | | 5,058,992 A | 10/1991 | Takahashi .................... 359/567 |
| 4,761,253 A | 8/1988 | Antes ......................... 264/1.3 | | 5,060,058 A | 10/1991 | Goldenberg et al. ........... 358/60 |
| 4,763,975 A | 8/1988 | Scifres et al. ............. 350/96.15 | | 5,061,049 A | 10/1991 | Hornbeck .................... 359/224 |
| 4,765,865 A | 8/1988 | Gealer et al. ................ 156/647 | | 5,066,614 A | 11/1991 | Dunnaway et al. ......... 437/209 |
| 4,772,094 A | 9/1988 | Sheiman ...................... 350/133 | | 5,068,205 A | 11/1991 | Baxter et al. ................ 437/205 |
| 4,797,694 A | 1/1989 | Agostinelli et al. ......... 346/160 | | 5,072,239 A | 12/1991 | Mitcham et al. ............ 346/108 |
| 4,797,918 A | 1/1989 | Lee et al. ...................... 380/20 | | 5,072,418 A | 12/1991 | Boutaud et al. ....... 364/715.06 |
| 4,801,194 A | 1/1989 | Agostinelli et al. ......... 350/356 | | 5,074,947 A | 12/1991 | Estes et al. ............... 156/307.3 |
| 4,803,560 A | 2/1989 | Matsunaga et al. .......... 359/236 | | 5,075,940 A | 12/1991 | Kuriyama et al. ......... 29/25.03 |
| 4,804,641 A | 2/1989 | Arlt et al. ..................... 437/227 | | 5,079,544 A | 1/1992 | DeMond et al. ............. 340/701 |
| 4,807,021 A | 2/1989 | Okumura ..................... 357/75 | | 5,081,617 A | 1/1992 | Gelbart ........................ 369/112 |
| 4,807,965 A | 2/1989 | Garakani ..................... 350/131 | | 5,083,857 A | 1/1992 | Hornbeck .................... 359/291 |
| 4,809,078 A | 2/1989 | Yabe et al. ................... 358/236 | | 5,085,497 A | 2/1992 | Um et al. ..................... 359/848 |
| 4,811,082 A | 3/1989 | Jacobs et al. ................. 357/80 | | 5,089,903 A | 2/1992 | Kuwayama et al. .......... 359/15 |
| 4,811,210 A | 3/1989 | McAulay ..................... 364/200 | | 5,093,281 A | 3/1992 | Eshima ........................ 437/217 |
| 4,814,759 A | 3/1989 | Gombrich et al. .......... 340/771 | | 5,096,279 A | 3/1992 | Hornbeck et al. ........... 359/230 |
| 4,817,850 A | 4/1989 | Wiener-Avnear et al. ... 228/119 | | 5,099,353 A | 3/1992 | Hornbeck .................... 359/291 |
| 4,824,200 A | 4/1989 | Isono et al. ............... 350/96.16 | | 5,101,184 A | 3/1992 | Antes .......................... 235/454 |
| 4,827,391 A | 5/1989 | Sills .............................. 363/41 | | 5,101,236 A | 3/1992 | Nelson et al. ................ 355/229 |
| 4,829,365 A | 5/1989 | Eichenlaub ................... 358/3 | | 5,103,334 A | 4/1992 | Swanberg .................... 359/197 |
| 4,836,649 A | 6/1989 | Ledebuhr et al. ....... 350/331 R | | 5,105,207 A | 4/1992 | Nelson ........................ 346/160 |
| 4,856,863 A | 8/1989 | Sampsell et al. ......... 350/96.16 | | 5,105,299 A | 4/1992 | Anderson et al. ............ 359/223 |
| 4,856,869 A | 8/1989 | Sakata et al. ........... 350/162.18 | | 5,105,369 A | 4/1992 | Nelson ........................ 364/525 |
| 4,859,012 A | 8/1989 | Cohn ....................... 350/96.24 | | 5,107,372 A | 4/1992 | Gelbart et al. ............... 359/824 |
| 4,859,060 A | 8/1989 | Katagiri et al. .............. 356/352 | | 5,112,436 A | 5/1992 | Bol ............................. 156/643 |
| 4,866,488 A | 9/1989 | Frensley ....................... 357/4 | | 5,113,272 A | 5/1992 | Reamey ........................ 359/53 |
| 4,882,683 A | 11/1989 | Rupp et al. .................. 364/521 | | 5,113,285 A | 5/1992 | Franklin et al. ............. 359/465 |
| 4,893,509 A | 1/1990 | MacIver et al. ......... 73/517 AV | | 5,115,344 A | 5/1992 | Jaskie ......................... 359/573 |
| 4,896,325 A | 1/1990 | Coldren ....................... 372/20 | | 5,119,204 A | 6/1992 | Hashimoto et al. ......... 358/254 |
| 4,896,948 A | 1/1990 | Dono et al. | | 5,121,343 A | 6/1992 | Faris .......................... 595/111 |
| 4,897,708 A | 1/1990 | Clements | | 5,126,812 A | 6/1992 | Greiff .......................... 357/25 |
| 4,902,083 A | 2/1990 | Wells | | 5,126,826 A | 6/1992 | Kauchi et al. ................ 357/72 |
| 4,915,463 A | 4/1990 | Barbee, Jr. | | 5,126,836 A | 6/1992 | Um .............................. 358/60 |
| 4,915,479 A | 4/1990 | Clarke | | 5,128,660 A | 7/1992 | DeMond et al. ............. 340/707 |
| 4,924,413 A | 5/1990 | Suwannukul | | 5,129,716 A | 7/1992 | Holakovszky et al. ......... 351/50 |
| 4,926,241 A | 5/1990 | Carey | | 5,132,723 A | 7/1992 | Gelbart ........................ 355/40 |
| 4,930,043 A | 5/1990 | Wiegand | | 5,132,812 A | 7/1992 | Takahashi et al. ............. 359/9 |
| 4,934,773 A | 6/1990 | Becker | | 5,136,695 A | 8/1992 | Goldshlag et al. ........... 395/275 |
| 4,940,309 A | 7/1990 | Baum | | 5,137,836 A | 8/1992 | Lam .............................. 437/8 |
| 4,943,815 A | 7/1990 | Aldrich et al. | | 5,142,303 A | 8/1992 | Nelson ........................ 346/108 |
| 4,945,773 A | 8/1990 | Sickafus ..................... 73/862.59 | | 5,142,405 A | 8/1992 | Hornbeck .................... 359/226 |
| 4,949,148 A | 8/1990 | Bartelink ..................... 357/74 | | 5,142,677 A | 8/1992 | Ehlig et al. .................. 395/650 |
| 4,950,890 A | 8/1990 | Gelbart .................. 250/237 G | | 5,144,472 A | 9/1992 | Sang, Jr. et al. ............. 359/254 |
| 4,952,925 A | 8/1990 | Haastert ..................... 340/784 | | 5,147,815 A | 9/1992 | Casto .......................... 437/51 |
| 4,954,789 A | 9/1990 | Sampsell ..................... 330/4.3 | | 5,148,157 A | 9/1992 | Florence ..................... 340/783 |
| 4,956,619 A | 9/1990 | Hornbeck .................... 330/4.3 | | 5,148,506 A | 9/1992 | McDonald ................... 385/16 |
| 4,961,633 A | 10/1990 | Ibrahim et al. ............... 350/392 | | 5,149,405 A | 9/1992 | Bruns et al. ............... 204/129.1 |

| Patent No. | Date | Inventor | Class |
|---|---|---|---|
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,185,823 A | 2/1993 | Kaku et al. | |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| D334,557 S | 4/1993 | Hunter et al. | D14/114 |
| D334,742 S | 4/1993 | Hunter et al. | D14/113 |
| 5,202,785 A | 4/1993 | Nelson | 359/214 |
| 5,206,629 A | 4/1993 | DeMond et al. | 340/719 |
| 5,206,829 A | 4/1993 | Thakoor et al. | |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,278 A | 6/1993 | Lin et al. | |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/289 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| D337,320 S | 7/1993 | Hunter et al. | D14/113 |
| 5,226,099 A | 7/1993 | Mignardi et al. | 385/19 |
| 5,229,597 A | 7/1993 | Fukatsu | |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/293 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/67 |
| 5,296,950 A | 3/1994 | Lin et al. | 359/9 |
| 5,298,460 A | 3/1994 | Nishiguchi et al. | 437/183 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,315,429 A | 5/1994 | Abramov | |
| 5,319,214 A | 6/1994 | Gregory et al. | 250/504 R |
| 5,319,789 A | 6/1994 | Ehlig et al. | 395/800 |
| 5,319,792 A | 6/1994 | Ehlig et al. | 395/800 |
| 5,320,709 A | 6/1994 | Bowden et al. | |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |

| | | | |
|---|---|---|---|
| 5,347,321 A | 9/1994 | Gove .......................... 348/663 |
| 5,347,378 A | 9/1994 | Handschy et al. ............ 359/53 |
| 5,347,433 A | 9/1994 | Sedlmayr ..................... 362/32 |
| 5,348,619 A | 9/1994 | Bohannon et al. .......... 156/664 |
| 5,349,687 A | 9/1994 | Ehlig et al. ................. 395/800 |
| 5,351,052 A | 9/1994 | D'Hont et al. ................ 342/42 |
| 5,352,926 A | 10/1994 | Andrews ..................... 257/717 |
| 5,354,416 A | 10/1994 | Okudaira .................... 156/643 |
| 5,357,369 A | 10/1994 | Pilling et al. ................ 359/462 |
| 5,357,803 A | 10/1994 | Lane ........................ 73/517 B |
| 5,359,349 A | 10/1994 | Jambor et al. .............. 345/168 |
| 5,359,451 A | 10/1994 | Gelbart et al. .............. 359/285 |
| 5,361,131 A | 11/1994 | Tekemori et al. ........... 356/355 |
| 5,363,220 A | 11/1994 | Kuwayama et al. ........... 359/3 |
| 5,365,283 A | 11/1994 | Doherty et al. ............. 348/743 |
| 5,367,585 A | 11/1994 | Ghezzo et al. ................ 385/23 |
| 5,371,543 A | 12/1994 | Anderson ................... 348/270 |
| 5,371,618 A | 12/1994 | Tai et al. ...................... 359/53 |
| 5,382,961 A | 1/1995 | Gale, Jr. ...................... 345/108 |
| 5,387,924 A | 2/1995 | Gale, Jr. et al. ............. 345/108 |
| 5,389,182 A | 2/1995 | Mignardi .................... 156/344 |
| 5,391,881 A | 2/1995 | Jeuch et al. ............ 250/370.09 |
| 5,392,140 A | 2/1995 | Ezra et al. .................... 359/41 |
| 5,392,151 A | 2/1995 | Nelson ....................... 359/223 |
| 5,394,303 A | 2/1995 | Yamaji ....................... 361/749 |
| 5,398,071 A | 3/1995 | Gove et al. ................. 348/558 |
| 5,399,898 A | 3/1995 | Rostoker .................... 257/499 |
| 5,404,365 A | 4/1995 | Hiiro ........................... 372/27 |
| 5,404,485 A | 4/1995 | Ban ............................ 395/425 |
| 5,408,123 A | 4/1995 | Murai ......................... 257/531 |
| 5,410,315 A | 4/1995 | Huber ......................... 342/42 |
| 5,411,769 A | 5/1995 | Hornbeck ................... 427/534 |
| 5,412,186 A | 5/1995 | Gale ........................... 219/679 |
| 5,412,501 A | 5/1995 | Fisli ............................ 359/286 |
| 5,418,584 A | 5/1995 | Larson ....................... 353/122 |
| 5,420,655 A | 5/1995 | Shimizu ....................... 353/33 |
| 5,420,722 A | 5/1995 | Bielak ........................ 359/708 |
| 5,426,072 A | 6/1995 | Finnila ....................... 437/208 |
| 5,427,975 A | 6/1995 | Sparks et al. ................. 437/79 |
| 5,430,524 A | 7/1995 | Nelson ....................... 355/200 |
| 5,435,876 A | 7/1995 | Alfaro et al. ............... 156/247 |
| 5,438,477 A | 8/1995 | Pasch ......................... 361/689 |
| 5,439,731 A | 8/1995 | Li et al. ...................... 428/209 |
| 5,442,411 A | 8/1995 | Urbanus et al. ............ 348/771 |
| 5,442,414 A | 8/1995 | Janssen et al. ................ 353/98 |
| 5,444,566 A | 8/1995 | Gale et al. .................. 359/291 |
| 5,445,559 A | 8/1995 | Gale et al. .................. 451/388 |
| 5,446,479 A | 8/1995 | Thompson et al. ......... 345/139 |
| 5,447,600 A | 9/1995 | Webb ........................... 216/2 |
| 5,448,314 A | 9/1995 | Heimbuch et al. .......... 348/743 |
| 5,448,546 A | 9/1995 | Pauli .......................... 369/112 |
| 5,450,088 A | 9/1995 | Meier et al. .................. 342/51 |
| 5,450,219 A | 9/1995 | Gold et al. ................... 359/40 |
| 5,451,103 A | 9/1995 | Hatanaka et al. ............. 353/31 |
| 5,452,024 A | 9/1995 | Sampsell .................... 348/755 |
| 5,452,138 A | 9/1995 | Mignardi et al. ........... 359/855 |
| 5,453,747 A | 9/1995 | D'Hont et al. ................ 342/42 |
| 5,453,778 A | 9/1995 | Venkateswar et al. ...... 347/239 |
| 5,453,803 A | 9/1995 | Shapiro et al. ............. 353/119 |
| 5,454,160 A | 10/1995 | Nickel .......................... 29/840 |
| 5,454,906 A | 10/1995 | Baker et al. ................. 216/66 |
| 5,455,445 A | 10/1995 | Kurtz et al. ................ 257/419 |
| 5,455,455 A | 10/1995 | Badehi ....................... 257/690 |
| 5,455,602 A | 10/1995 | Tew ........................... 347/239 |
| 5,457,493 A | 10/1995 | Leddy et al. ............... 348/164 |
| 5,457,566 A | 10/1995 | Sampsell et al. ........... 359/292 |
| 5,457,567 A | 10/1995 | Shinohara .................. 359/305 |
| 5,458,716 A | 10/1995 | Alfaro et al. ............... 156/245 |
| 5,459,492 A | 10/1995 | Venkateswar ............... 347/253 |
| 5,459,528 A | 10/1995 | Pettitt ........................ 348/568 |
| 5,459,592 A | 10/1995 | Shibatani et al. ............ 359/40 |
| 5,459,610 A | 10/1995 | Bloom et al. ............... 359/572 |
| 5,461,197 A | 10/1995 | Hiruta et al. ............... 174/52.4 |
| 5,461,410 A | 10/1995 | Venkateswar et al. ...... 347/240 |
| 5,461,411 A | 10/1995 | Florence et al. ............ 347/240 |
| 5,461,547 A | 10/1995 | Ciupk et al. ................. 362/31 |
| 5,463,347 A | 10/1995 | Jones et al. ................. 330/253 |
| 5,463,497 A | 10/1995 | Muraki et al. .............. 359/618 |
| 5,465,175 A | 11/1995 | Woodgate et al. .......... 359/463 |
| 5,467,106 A | 11/1995 | Salomon ...................... 345/87 |
| 5,467,138 A | 11/1995 | Gove ......................... 348/452 |
| 5,467,146 A | 11/1995 | Huang et al. ............... 348/743 |
| 5,469,302 A | 11/1995 | Lim ........................... 359/846 |
| 5,471,341 A | 11/1995 | Warde et al. ............... 359/293 |
| 5,473,512 A | 12/1995 | Degani et al. .............. 361/760 |
| 5,475,236 A | 12/1995 | Yoshizaki .................... 257/48 |
| 5,480,839 A | 1/1996 | Ezawa et al. ............... 437/209 |
| 5,481,118 A | 1/1996 | Tew ........................... 250/551 |
| 5,481,133 A | 1/1996 | Hsu ............................ 257/621 |
| 5,482,564 A | 1/1996 | Douglas et al. .............. 134/18 |
| 5,482,818 A | 1/1996 | Nelson ....................... 430/394 |
| 5,483,307 A | 1/1996 | Anderson ..................... 353/98 |
| 5,485,172 A | 1/1996 | Sawachika et al. ............ 345/8 |
| 5,485,304 A | 1/1996 | Kaeriyama .................. 359/291 |
| 5,485,354 A | 1/1996 | Ciupke et al. ................ 362/31 |
| 5,486,698 A | 1/1996 | Hanson et al. .............. 250/332 |
| 5,486,841 A | 1/1996 | Hara et al. ..................... 345/8 |
| 5,486,946 A | 1/1996 | Jachimowicz et al. ...... 359/263 |
| 5,488,431 A | 1/1996 | Gove et al. ................. 348/716 |
| 5,489,952 A | 2/1996 | Gove et al. ................. 348/771 |
| 5,490,009 A | 2/1996 | Venkateswar et al. ...... 359/291 |
| 5,491,510 A | 2/1996 | Gove ........................... 348/77 |
| 5,491,612 A | 2/1996 | Nicewarner, Jr. ........... 361/760 |
| 5,491,715 A | 2/1996 | Flaxl .......................... 375/344 |
| 5,493,177 A | 2/1996 | Muller et al. ............... 313/578 |
| 5,493,439 A | 2/1996 | Engle ......................... 359/292 |
| 5,497,172 A | 3/1996 | Doherty et al. ............... 345/85 |
| 5,497,197 A | 3/1996 | Gove et al. ................. 348/388 |
| 5,497,262 A | 3/1996 | Kaeriyama .................. 359/223 |
| 5,499,060 A | 3/1996 | Gove et al. ................. 348/651 |
| 5,499,062 A | 3/1996 | Urbanus ..................... 348/771 |
| 5,500,761 A | 3/1996 | Goossen et al. ............ 359/290 |
| 5,502,481 A | 3/1996 | Dentinger et al. ............ 348/51 |
| 5,504,504 A | 4/1996 | Markandey et al. ........ 345/214 |
| 5,504,514 A | 4/1996 | Nelson ....................... 347/130 |
| 5,504,575 A | 4/1996 | Stafford ..................... 356/330 |
| 5,504,614 A | 4/1996 | Webb et al. ................ 359/223 |
| 5,506,171 A | 4/1996 | Leonard et al. ............ 437/187 |
| 5,506,597 A | 4/1996 | Thompson et al. ........... 345/85 |
| 5,506,720 A | 4/1996 | Yoon .......................... 359/224 |
| 5,508,558 A | 4/1996 | Robinette, Jr. et al. ...... 257/700 |
| 5,508,561 A | 4/1996 | Tago et al. .................. 257/737 |
| 5,508,565 A | 4/1996 | Hatakeyama et al. ....... 257/777 |
| 5,508,750 A | 4/1996 | Hewlett et al. ............. 348/558 |
| 5,508,840 A | 4/1996 | Vogel et al. ................ 359/291 |
| 5,508,841 A | 4/1996 | Lin et al. .................... 359/318 |
| 5,510,758 A | 4/1996 | Fujita et al. ................ 333/247 |
| 5,510,824 A | 4/1996 | Nelson ....................... 347/239 |
| 5,512,374 A | 4/1996 | Wallace et al. ............. 428/422 |
| 5,512,748 A | 4/1996 | Hanson ....................... 250/332 |
| 5,515,076 A | 5/1996 | Thompson et al. ......... 345/139 |
| 5,516,125 A | 5/1996 | McKenna ..................... 279/3 |
| 5,517,340 A | 5/1996 | Doany et al. ................. 359/41 |
| 5,517,347 A | 5/1996 | Sampsell .................... 359/224 |
| 5,517,357 A | 5/1996 | Shibayama ................. 359/547 |
| 5,517,359 A | 5/1996 | Gelbart ....................... 359/623 |
| 5,519,251 A | 5/1996 | Sato et al. .................. 257/666 |
| 5,519,450 A | 5/1996 | Urbanus et al. ............ 348/600 |
| 5,521,748 A | 5/1996 | Sarraf ......................... 359/321 |
| 5,523,619 A | 6/1996 | McAllister et al. ......... 257/686 |
| 5,523,628 A | 6/1996 | Williams et al. ............ 257/777 |
| 5,523,803 A | 6/1996 | Urbanus et al. ............ 348/771 |

| Patent No. | Date | Inventor | Class |
|---|---|---|---|
| 5,523,878 A | 6/1996 | Wallace et al. | 359/290 |
| 5,523,881 A | 6/1996 | Florence et al. | 359/561 |
| 5,523,920 A | 6/1996 | Machuga et al. | 361/767 |
| 5,524,155 A | 6/1996 | Weaver | 385/24 |
| 5,534,107 A | 7/1996 | Gray et al. | 156/643.1 |
| 5,534,883 A | 7/1996 | Koh | 345/3 |
| 5,539,422 A | 7/1996 | Heacock et al. | 345/8 |
| 5,544,306 A | 8/1996 | Deering et al. | 395/164 |
| 5,552,635 A | 9/1996 | Kim et al. | |
| 5,554,304 A | 9/1996 | Suzuki | 216/2 |
| 5,576,878 A | 11/1996 | Henck | 359/224 |
| 5,602,671 A | 2/1997 | Hornbeck | 359/224 |
| 5,606,181 A | 2/1997 | Sakuma et al. | 257/88 |
| 5,606,447 A | 2/1997 | Asada et al. | 359/199 |
| 5,610,438 A | 3/1997 | Wallace et al. | 257/682 |
| 5,623,361 A | 4/1997 | Engle | 359/291 |
| 5,629,566 A | 5/1997 | Doi et al. | 257/789 |
| 5,629,801 A | 5/1997 | Staker et al. | 359/572 |
| 5,640,216 A | 6/1997 | Hasegawa et al. | 349/58 |
| 5,658,698 A | 8/1997 | Yagi et al. | 430/11 |
| 5,661,592 A | 8/1997 | Bornstein et al. | 359/291 |
| 5,661,593 A | 8/1997 | Engle | 359/292 |
| 5,663,817 A | 9/1997 | Frapin et al. | 349/5 |
| 5,668,611 A | 9/1997 | Ernstoff et al. | 348/771 |
| 5,673,139 A | 9/1997 | Johnson | 359/291 |
| 5,677,783 A | 10/1997 | Bloom et al. | 359/224 |
| 5,689,361 A | 11/1997 | Damen et al. | 359/284 |
| 5,691,836 A | 11/1997 | Clark | 359/247 |
| 5,694,740 A | 12/1997 | Martin et al. | 53/431 |
| 5,696,560 A | 12/1997 | Songer | 348/436 |
| 5,699,740 A | 12/1997 | Gelbart | 101/477 |
| 5,704,700 A | 1/1998 | Kappel et al. | 353/31 |
| 5,707,160 A | 1/1998 | Bowen | 400/472 |
| 5,712,649 A | 1/1998 | Tosaki | 345/8 |
| 5,713,652 A | 2/1998 | Zavracky et al. | 353/122 |
| 5,726,480 A | 3/1998 | Pister | 257/415 |
| 5,731,802 A | 3/1998 | Aras et al. | 345/148 |
| 5,734,224 A | 3/1998 | Tagawa et al. | 313/493 |
| 5,742,373 A | 4/1998 | Alvelda | 349/204 |
| 5,744,752 A | 4/1998 | McHerron et al. | 174/52.4 |
| 5,745,271 A | 4/1998 | Ford et al. | 359/130 |
| 5,757,354 A | 5/1998 | Kawamura | 345/126 |
| 5,757,536 A | 5/1998 | Ricco et al. | 359/224 |
| 5,764,280 A | 6/1998 | Bloom et al. | 348/53 |
| 5,768,009 A | 6/1998 | Little | 359/393 |
| 5,770,473 A | 6/1998 | Hall et al. | 438/26 |
| 5,793,519 A | 8/1998 | Furlani et al. | 359/291 |
| 5,798,743 A | 8/1998 | Bloom | 345/90 |
| 5,798,805 A | 8/1998 | Ooi et al. | 349/10 |
| 5,801,074 A | 9/1998 | Kim et al. | 438/125 |
| 5,802,222 A | 9/1998 | Rasch et al. | 385/1 |
| 5,808,323 A | 9/1998 | Spaeth et al. | 257/88 |
| 5,808,797 A | 9/1998 | Bloom et al. | 359/572 |
| 5,815,126 A | 9/1998 | Fan et al. | 345/8 |
| 5,825,443 A | 10/1998 | Kawasaki et al. | 349/95 |
| 5,832,148 A | 11/1998 | Yariv | |
| 5,835,255 A | 11/1998 | Miles | 359/291 |
| 5,835,256 A | 11/1998 | Huibers | 359/291 |
| 5,837,562 A | 11/1998 | Cho | 438/51 |
| 5,841,579 A | 11/1998 | Bloom et al. | 359/572 |
| 5,841,929 A | 11/1998 | Komatsu et al. | |
| 5,844,711 A | 12/1998 | Long, Jr. | 359/291 |
| 5,847,859 A | 12/1998 | Murata | 359/201 |
| 5,862,164 A | 1/1999 | Hill | 372/27 |
| 5,868,854 A | 2/1999 | Kojima et al. | 134/1.3 |
| 5,886,675 A | 3/1999 | Aye et al. | 345/7 |
| 5,892,505 A | 4/1999 | Tropper | 345/208 |
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,942,791 A | 8/1999 | Shorrocks et al. | 257/522 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A * | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansoon | 361/233 |
| 6,241,143 B1 | 6/2001 | Kuroda | 228/110.1 |

| | | | | | | | |
|---|---|---|---|---|---|---|---|
| 6,249,381 | B1 | 6/2001 | Suganuma | EP | 0 643 314 A2 | 3/1995 | ............ G02B/27/00 |
| 6,251,842 | B1 | 6/2001 | Gudeman .................... 508/577 | EP | 0 654 777 A1 | 5/1995 | ............ G09G/3/34 |
| 6,252,697 | B1 | 6/2001 | Hawkins et al. ............ 359/290 | EP | 0 658 868 A1 | 6/1995 | ............ G09G/3/34 |
| 6,254,792 | B1 | 7/2001 | Van Buskirk et al. ........ 216/13 | EP | 0 658 830 A1 | 12/1995 | ............ G09G/3/34 |
| 6,261,494 | B1 | 7/2001 | Zavracky et al. ........... 264/104 | EP | 0 689 078 A1 | 12/1995 | ............ G02B/26/08 |
| 6,268,952 | B1 | 7/2001 | Godil et al. ................. 359/291 | EP | 0 801 319 A1 | 10/1997 | ............ G02B/26/00 |
| 6,271,145 | B1 | 8/2001 | Toda ........................... 438/706 | EP | 0 851 492 A2 | 7/1998 | ......... H01L/23/538 |
| 6,271,808 | B1 | 8/2001 | Corbin .......................... 345/7 | EP | 1 003 071 A2 | 5/2000 | ............ G03B/27/72 |
| 6,274,469 | B1 | 8/2001 | Yu ............................... 438/592 | EP | 1 014 143 A1 | 6/2000 | ............ G02B/26/08 |
| 6,282,213 | B1 | 8/2001 | Gutin et al. | EP | 1 040 927 A2 | 10/2000 | ............ B41J/2/455 |
| 6,290,859 | B1 | 9/2001 | Fleming et al. ................ 216/2 | GB | 2 117 564 A | 10/1983 | ............ H01L/25/08 |
| 6,290,864 | B1 | 9/2001 | Patel et al. .................... 216/79 | GB | 2 118 365 A | 10/1983 | ............ H01L/27/13 |
| 6,300,148 | B1 | 10/2001 | Birdsley et al. ............. 438/15 | GB | 2 266 385 A | 10/1993 | ............ G02B/23/10 |
| 6,303,986 | B1 | 10/2001 | Shook ........................ 257/680 | GB | 2 296 152 A | 6/1996 | ........... H04N/13/04 |
| 6,310,018 | B1 | 10/2001 | Behr et al. ................. 510/175 | GB | 2 319 424 A | 5/1998 | ............ H04N/13/04 |
| 6,313,901 | B1 | 11/2001 | Cacharelis | JP | 53-39068 | 4/1978 | ............ H01L/23/12 |
| 6,323,984 | B1 | 11/2001 | Trisnadi ..................... 359/245 | JP | 55-111151 | 8/1980 | ............ H01L/27/00 |
| 6,327,071 | B1 * | 12/2001 | Kimura ...................... 359/291 | JP | 57-31166 | 2/1982 | ............ H01L/23/48 |
| 6,342,960 | B1 | 1/2002 | McCullough ............... 359/124 | JP | 57-210638 | 12/1982 | ............ H01L/21/60 |
| 6,346,430 | B1 | 2/2002 | Raj et al. | JP | 60-49638 | 3/1985 | ............ H01L/21/60 |
| 6,356,577 | B1 | 3/2002 | Miller ........................ 372/107 | JP | 60-94756 | 5/1985 | ............ H01L/25/04 |
| 6,356,689 | B1 | 3/2002 | Greywall ..................... 385/52 | JP | 60-250639 | 12/1985 | ............ H01L/21/58 |
| 6,359,333 | B1 | 3/2002 | Wood et al. ................. 257/704 | JP | 61-142750 | 6/1986 | ............ H01L/21/60 |
| 6,384,959 | B1 | 5/2002 | Furlani et al. ............... 359/291 | JP | 61-145838 | 7/1986 | ............ H01L/21/60 |
| 6,387,723 | B1 | 5/2002 | Payne et al. ................... 438/48 | JP | 63-234767 | 9/1988 | ............ H04N/1/04 |
| 6,392,309 | B1 | 5/2002 | Wataya et al. ............... 257/796 | JP | 63-305323 | 12/1988 | ............ G02F/1/13 |
| 6,396,789 | B1 | 5/2002 | Guerra et al. ................ 369/112 | JP | 1-155637 | 6/1989 | ............ H01L/21/66 |
| 6,418,152 | B1 | 7/2002 | Davis | JP | 40-1155637 | 6/1989 | ............ H01L/21/92 |
| 6,421,179 | B1 | 7/2002 | Gutin et al. ................. 359/572 | JP | 2219092 | 8/1990 | ............ G09G/3/28 |
| 6,438,954 | B1 | 8/2002 | Goetz et al. | JP | 4-333015 | 11/1992 | ............ G02B/27/18 |
| 6,445,502 | B1 | 9/2002 | Islam et al. ................. 359/571 | JP | 7-281161 | 10/1995 | ......... G02F/1/1333 |
| 6,452,260 | B1 | 9/2002 | Corbin et al. ............... 257/686 | JP | 3288369 | 3/2002 | ............ G02B/26/06 |
| 6,466,354 | B1 * | 10/2002 | Gudeman ................... 359/247 | WO | WO 90/13913 | 11/1990 | ............ H01L/23/10 |
| 6,479,811 | B1 | 11/2002 | Kruschwitz et al. | WO | WO 92/12506 | 7/1992 | ............ G09F/9/37 |
| 6,480,634 | B1 | 11/2002 | Corrigan ........................ 385/4 | WO | WO 93/02269 | 2/1993 | ............ E06B/5/10 |
| 6,497,490 | B1 | 12/2002 | Miller et al. ................. 359/614 | WO | WO 93/09472 | 5/1993 | ............ G03F/7/20 |
| 6,512,625 | B2 * | 1/2003 | Mei et al. .................... 359/290 | WO | WO 93/18428 | 9/1993 | |
| 6,525,863 | B1 | 2/2003 | Riza ........................... 359/290 | WO | WO 93/22694 | 11/1993 | ............ G02B/5/18 |
| 6,563,974 | B2 | 5/2003 | Weaver et al. ................ 385/18 | WO | WO 94/09473 | 4/1994 | ............ G09G/3/34 |
| 6,569,717 | B1 | 5/2003 | Murade | WO | WO 94/29761 | 12/1994 | ............ G02B/27/24 |
| 6,642,913 | B1 * | 11/2003 | Kimura et al. ................. 345/84 | WO | WO 95/11473 | 4/1995 | ............ G02B/27/00 |
| 2001/0019454 | A1 | 9/2001 | Tadic-Galeb et al. ........ 359/649 | WO | WO 96/02941 | 2/1996 | ............ H01L/23/02 |
| 2002/0015230 | A1 | 2/2002 | Pilossof et al. .............. 359/558 | WO | WO 96/08031 | 3/1996 | ............ H01J/29/12 |
| 2002/0021485 | A1 | 2/2002 | Pilossof ...................... 359/295 | WO | WO 96/41217 | 12/1996 | ............ G02B/5/18 |
| 2002/0079432 | A1 | 6/2002 | Lee et al. .................... 250/216 | WO | WO 96/41224 | 12/1996 | ............ G02B/19/00 |
| 2002/0105725 | A1 | 8/2002 | Sweatt et al. ................ 359/566 | WO | WO 97/22033 | 6/1997 | ............ G02B/27/22 |
| 2002/0112746 | A1 | 8/2002 | DeYoung et al. ............. 134/36 | WO | WO 97/26569 | 7/1997 | ............ G02B/5/18 |
| 2002/0131228 | A1 | 9/2002 | Potter | WO | WO 98/05935 | 2/1998 | ............ G01L/9/06 |
| 2002/0131230 | A1 | 9/2002 | Potter ......................... 361/277 | WO | WO 98/24240 | 6/1998 | ............ H04N/9/31 |
| 2002/0135708 | A1 | 9/2002 | Murden et al. | WO | WO 98/41893 | 9/1998 | ............ G02B/26/08 |
| 2002/0176151 | A1 | 11/2002 | Moon et al. | WO | WO 99/07146 | 2/1999 | ............ H04N/7/16 |
| 2002/0195418 | A1 | 12/2002 | Kowarz et al. | WO | WO 99/12208 | 3/1999 | ......... H01L/25/065 |
| 2002/0196492 | A1 | 12/2002 | Trisnadi et al. | WO | WO 99/23520 | 5/1999 | ............ G02B/26/08 |
| 2003/0056078 | A1 | 3/2003 | Johansson et al. | WO | WO 99/34484 | 7/1999 | |
| | | | | WO | WO 99/59335 | 11/1999 | .......... H04N/5/765 |
| | | FOREIGN PATENT DOCUMENTS | | WO | WO 99/63388 | 12/1999 | ............ G02B/27/22 |
| EP | 0 322 714 A2 | 7/1989 | ............ G02B/5/30 | WO | WO 99/67671 | 12/1999 | ............ G02B/26/08 |
| EP | 0 627 644 A3 | 9/1990 | ............ G02B/27/00 | WO | WO 00/04718 | 1/2000 | ............ H04N/7/167 |
| EP | 0 417 039 A1 | 3/1991 | ............ G03B/21/20 | WO | WO 00/07225 | 2/2000 | ............ H01L/21/00 |
| EP | 0 423 513 A2 | 4/1991 | ............ H01S/3/085 | WO | WO 01/04674 A1 | 1/2001 | ............ G02B/6/12 |
| EP | 0 436 738 A1 | 7/1991 | ............ H04N/5/74 | WO | WO 01/006297 A3 | 1/2001 | ............ G02B/27/10 |
| EP | 0 458 316 A2 | 11/1991 | ............ G06K/11/06 | WO | WO 01/57581 A3 | 8/2001 | ............ G02B/27/48 |
| EP | 0 477 566 A2 | 4/1992 | ............ G02B/26/08 | WO | WO 02/025348 A3 | 3/2002 | ............ G02B/26/02 |
| EP | 0 488 326 A3 | 6/1992 | ............ G09G/3/28 | WO | WO 02/31575 A2 | 4/2002 | ............ G02B/27/00 |
| EP | 0 499 566 A2 | 8/1992 | ............ G06F/3/033 | WO | WO 02/058111 A2 | 7/2002 | |
| EP | 0 528 646 A1 | 2/1993 | ............ G09G/3/02 | WO | WO 02/065184 A3 | 8/2002 | ............ G02B/27/12 |
| EP | 0 530 760 A2 | 3/1993 | ............ G09G/3/34 | WO | WO 02/073286 A2 | 9/2002 | ............ G02B/26/08 |
| EP | 0 550 189 A1 | 7/1993 | ............ G02F/1/315 | WO | WO 02/084375 A1 | 10/2002 | ............ G02B/26/08 |
| EP | 0 610 665 A1 | 8/1994 | ............ G09G/3/34 | WO | WO 02/084397 A3 | 10/2002 | ............ G02B/27/18 |
| EP | 0 627 644 A2 | 12/1994 | ............ G02B/27/00 | WO | WO 03/001281 A1 | 1/2003 | ............ G02F/1/01 |
| EP | 0 627 850 A1 | 12/1994 | ............ H04N/5/64 | WO | WO 03/001716 A1 | 1/2003 | ............ H04J/14/02 |

| | | | | |
|---|---|---|---|---|
| WO | WO 03/012523 A1 | 2/2003 | ............ | G02B/26/00 |
| WO | WO 03/016965 A1 | 2/2003 | ............ | G02B/5/18 |
| WO | WO 03/023849 A1 | 3/2003 | ............ | H01L/23/02 |
| WO | WO 03/025628 A2 | 3/2003 | | |

OTHER PUBLICATIONS

R. Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Fam et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors,"+09 Optical Engineering, vol. 36, No. 5, pp 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

T. Iwai et al., "Real–time Profiling of a Pure Phase Object Using an Auto–Wigner Distribution Function," Optics Communications, vol. 95, Nos. 4–6, Jan. 15, 1993, pp 199–204.

R. Tepe, et al. "Viscoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997. pp. 377 of 379.

N.J. Frigo et al., "A Wavelength–Division Multiplexed Passive Optical Network with Cost–Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal of Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum–Optical Components, Feb. 2001, pp. 1 of 10.

R. Plastow, "Tunable Lasers and Future Optical Networks", Forum–Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechnical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promises Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2,"J. Chem. Phys. 87 (3), Aug. 1, 1987, pp. 1866–1872.

Mehran Mehregany, "Microelectromechanical Systems," 1993 IEEE, pp. 14–22.

D. Moser et al., "A CMOS Compatible Thermally Excited silicon Oxide Beam Resonator with Aluminium Mirror," Physical Electronics Laboratory, 1991 IEEE, pp. 547–550.

M. Parameswaran et al., "Commerical CMOS Fabricated Integrated Dynamic Thermal Scene Simulator," 1991 IEEE, pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106,(1996), pp. 341–346.

M.J.M Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5,3, (1993), pp. 125–134.

Z. Parpia et al., "Modelling of CMOS Compatible High Voltage Device Structures," pp. 41–50.

Jon Gildemeister, "Xenon Difluoride Etching System" 1997, UC Berkeley MicroTabrication Manual Chapter 7.15, p. 2–5.

W. Riethmuller et al., "A smart accelerometer with on–chip electronics fabricated by a commerical CMOS process," Sensors and Actuators A. 31, (1992), 121–124.

W. Gopel et al., "Sensors– A Comprehensive Survey," vol. 7, Weinheim New York, 44 pgs.

D. E. Ibbotson et al., "Comparison of XeF2 and F–atom reations with Si and SiO2," 1984 American Institute of Physics, pp. 1129–1131.

D.E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the Al/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, 4/83, pp. 117–121.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–000802142, Optics Letters, Dec. 15, 1998, vol. 23, No. 24, pp. 1933 of 1935.

P.C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, pp. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E–Cinema Applications", Silicon Light Machines, SID'99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

Claude, T. et al. "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Gloossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14.

A. P. Payne et al., "Resonance Measurements of Stresses in $Al/Si_3N_4$ Micro–Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44.4: Ferroelectric Microdisplays Using Distortion–Compensated Pixel Layouts", SID 95 Digest, XP 2020715, pp. 931–933.

Thomas et al., "The Mirror–Matrix Tube: A Novel Light Valve for Projection Displays," IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

* cited by examiner

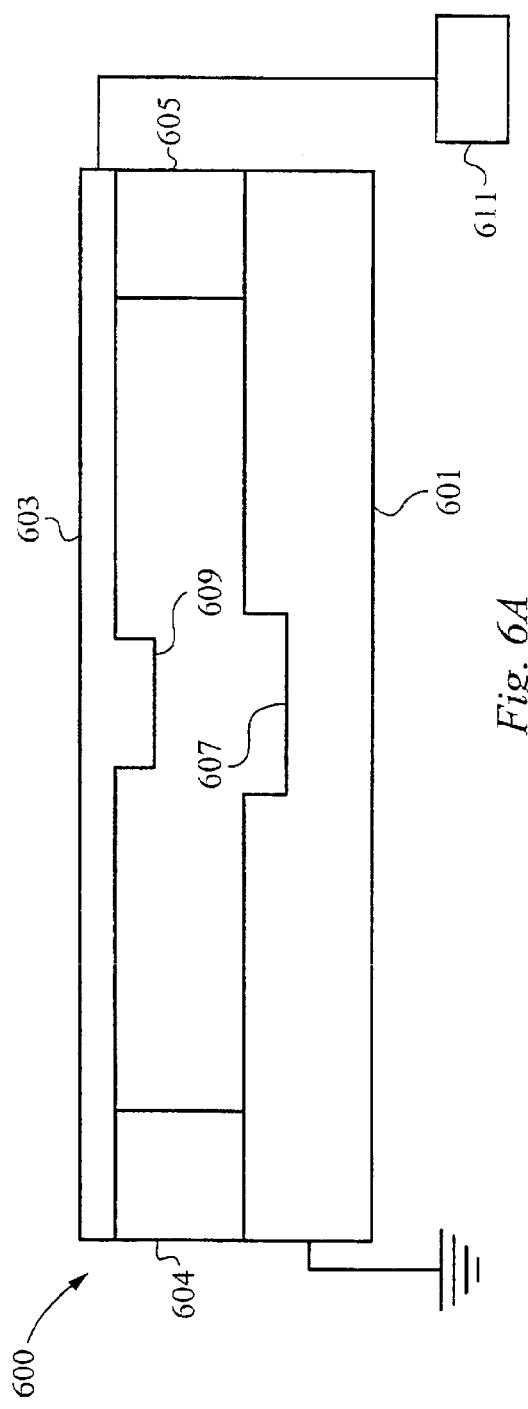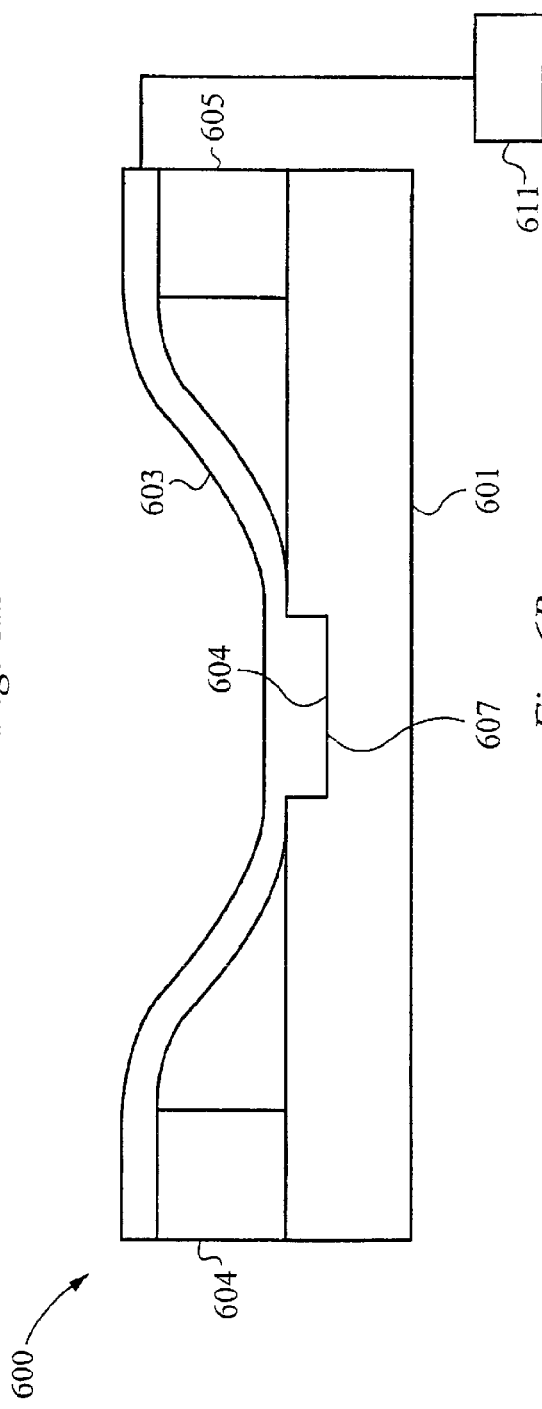

REDUCED FORMATION OF ASPERITIES IN CONTACT MICRO-STRUCTURES

FIELD OF THE INVENTION

The present invention is related to micro-structures which are configured to move. More particularly, the present invention is related to micro-structures which are configured to move and contact.

BACKGROUND OF THE INVENTION

A number of micro-machines utilize movable cantilevers, ribbon structures or other similar micro-structures. Typically, these micro-structures are extremely thin; on the order of hundreds or thousands of Angstroms, and are formed through release etch processes.

Optical MEM (micro-electro-mechanical) devices are used to modulate one or more wavelengths of light. Optical MEM devices can have applications in display, print and electrical device technologies. Examples of an optical MEM device which utilize suspended micro-ribbon structures to modulate light are disclosed in the U.S. Pat. Nos. 5,311,360, 5,841,579 and 5,808,797, all issued to Bloom et al., the contents of which are hereby incorporated by reference.

Briefly, an optical MEM device described in the above referenced patents has one or more sets of movable ribbons that comprise a support layer and a reflective top-layer. The support layer is preferably a silicon nitride layer and the reflective top-layer is preferably an aluminum layer. The ribbon structures are typically secured to a substrate through opposite ends of the ribbon, whereby center portions of the ribbons, referred to herein as the active portions, move up and down to modulate an incident light source.

The ribbons are configured to move by applying a bias voltage across the ribbons and the substrate. In order to effectively modulate light, the distance that the ribbons are moved must be controllable and reproducible. In one construction, an optical MEM device has ribbons that are suspended at a fixed distance from the substrate and the ribbons are selectively moved to contact the substrate. Unfortunately, this results in weld spots or surface artifacts generally referred to herein as asperities. Asperities which develop over time can greatly effect the ability of the ribbons to move in a controllable and/or reproducible manner and can cause the ribbons to stick to the substrate. There are many MEM devices, including cantilever devices and oscillator devices, where movable structures which contact the substrate, or other micro-structure, is advantageous if the formation asperities and sticking of the contacting parts can be avoided or reduced.

SUMMARY OF THE INVENTION

A device, in accordance with the embodiments of the invention, comprises one or more micro-structures suspended over a substrate. The micro-structures can be, but are not limited to, cantilevers, ribbons and combs structures configured to move relative to the substrate and contact a portion of the substrate. Preferably, the micro-structures are ribbons having lengths in a range of about 50 to about 500 microns and widths in a range of about 4.0 to about 40 microns and are configured to modulate light having one or more wavelengths in a range of about 300 to about 3000 nanometers.

In accordance with the embodiments of the invention, the substrate has a metal-insulator-metal construction comprising a lower metal layer and an upper metal layer with an insulator layer sandwiched therebetween. Preferably, the upper metal layer and the insulator layer are patterned with vias to expose portions of the lower metal layer and to provide contact regions for complimentary contact regions on the ribbons. In a preferred embodiment, the substrate has a metal-insulator-metal construction comprising titanium nitride metal layers and a silicon oxide insulator layer.

The ribbons have at least one metal under layer. The metal under layer comprises contact regions and non-contact regions. In accordance the with embodiments of the invention, the ribbons also have a metal-insulator-metal construction. For example, the ribbons have an under layer of titanium nitride, a top layer of aluminum and a silicon nitride insulator layer sandwiched therebetween.

In operation, a bias voltage is applied across selected micro-structures, or ribbons, and the upper metal layer of the metal-insulator-metal construction on the substrate. The lower metal layer is maintained at a reduced potential relative to the applied bias voltage and is preferably maintained at a zero, or near to zero, potential relative to the applied bias voltage. The bias voltage between the selected micro-structures and the upper metal layer of the metal-insulator-metal construction on the substrate urges the selected micro-structures to move towards the substrate and to contact the substrate. The micro-structures and substrate make contact through the contact regions in the lower metal layer of the metal-insulator-metal construction of the substrate and contact regions on the under layer of the micro-structures.

Contact regions of the micro-structures preferably protrude, such that the contact regions of the micro-structures insert, or fit, into the vias patterned through the upper metal layer and the insulator layer of the metal-insulator-metal construction of the substrate. Because the potential difference between the contact regions of the micro-structures and the contact regions of the substrate are minimized, or reduce, the formation of asperities and sticking of contacting parts is also minimized or reduced.

In accordance with the method of the invention, a micro-device is made by forming a substrate structure comprising a metal-insulator-metal construction. In accordance with the embodiments of the invention, a lower metal layer of titanium nitride is deposited to a thickness in range of about 200 to about 2000 Angstroms. Over the lower metal layer, a insulator layer of silicon oxide and an upper metal layer of titanium nitride are deposited to a thickness in a range of about 200 to about 2000 Angstrom. The insulator layer and the upper metal layer of the metal-insulator-metal construction are patterned with contact vias. The metal-insulator-metal construction can be patterned with the contact vias using selective deposition processes, etch process or a combination thereof.

Over the substrate, micro-structures, or ribbons, are preferably formed by first depositing a layer of poly-silicon and etching the layer of poly-silicon to form support regions for coupling a device layer to the substrate. The device layer is then formed over the patterned poly-silicon layer and is cut into ribbons with the appropriate dimension using any suitable process, such as a reactive ion etch process. After the device layer is cut into ribbons, the underlying poly-silicon is etched using any suitable processes, such as a xenon diflouride etch process to release the ribbons.

BRIEF DESCRIPTION OF THE DRAWINGS

FIG. 3b is cross-sectional representation of a micro-structure having a plurality of ribbon structures, such as the one shown in FIG. 3a.

FIGS. 6a–b show a ribbon structure configured to contact a substrate, in accordance with the method of the invention.

DETAILED DESCRIPTION OF THE EMBODIMENTS

Figure 1A:
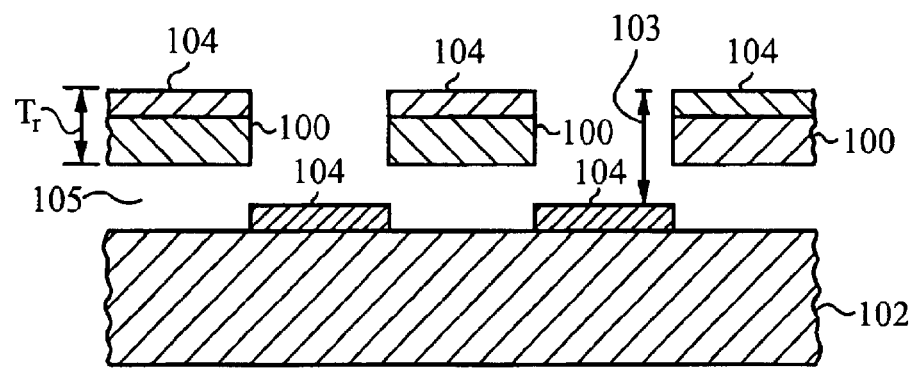
FIGS. 1a–b are cross-sectional representations of a micro-structure having a plurality of moveable ribbon structures, in accordance with the invention.

Referring to FIG. 1a, an optical MEM device can have a plurality of movable ribbons 100 that are spatially arranged over a substrate 102. The surfaces 104, corresponding to the ribbon tops and the regions of the substrate between the ribbons, are reflective. The surfaces 104 are made to be reflective by depositing a thin film of reflective material, such as silver or aluminum on the substrate 102 and the ribbons 100. The ribbons and the substrate structure are fabricated from silicon-based materials. The height difference 103 between the reflective surfaces 104 of the substrate 102 and the reflective surfaces 104 of the ribbons 100 are configured to be $\lambda/2$ when the ribbons 100 are in the up position, as shown in FIG. 1a. When light having a wavelength $\lambda$ impinges on the compliment of reflective surfaces comprising ribbon and substrate surfaces 104, light that is reflected from the surfaces 104 of the substrate 102 and ribbons 100 will be in phase. Light which strikes the reflective surfaces 104 of the substrate 102 travels $\lambda/2$ further than the light striking the reflective surfaces 104 of the ribbons 100. Then the portion of light that is reflected back from the reflective surfaces 104 of the substrate 102 returns traveling an addition $\lambda/2$ for a total of one complete wavelength $\lambda$. Therefore, the compliment of the reflective surfaces 104 function as a mirror to the incident light source with a wavelength $\lambda$.

Figure 1B:
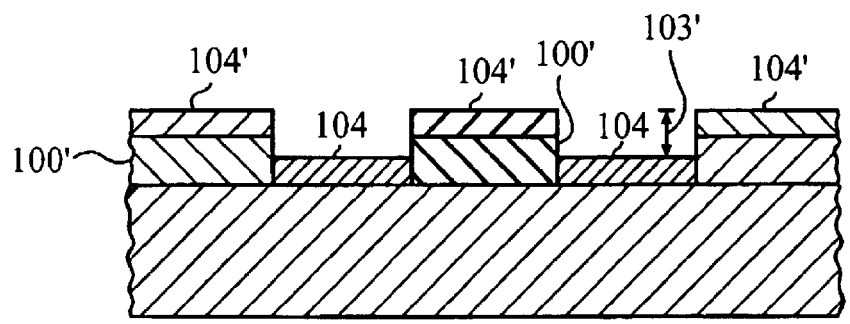

By applying an appropriate bias voltage across the ribbons 100 and the substrate 102, a portion of the ribbons 100 move towards and contact the substrate 102, as shown in FIG. 1b. The thickness $T_r$ of the ribbons 100 is designed to be $\lambda/4$ such that the distance 103' is also $\lambda/4$. When light having a wavelength $\lambda$ impinges on surfaces 104 and 104' with the ribbons 100 in the down position, as shown in FIG. 1b, the portion of light reflected from the surfaces 104 of the ribbons 100 will be out of phase with the portion of light reflected from the surfaces 104 of the substrate 102, thereby generating the conditions for destructive interference. By alternating the ribbons between the positions for constructive interference, as shown in FIG. 1a, and the positions for destructive interference, as shown in FIG. 1b, the optical MEM device is capable of modulating the intensity of reflected light from an impinging light source having a wavelength $\lambda$.

Figure 2A:
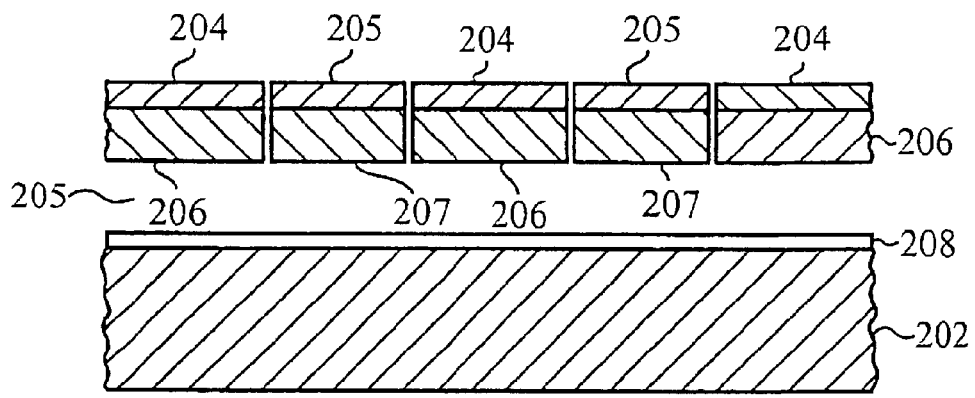
FIGS. 2a–b are cross-sectional representations of a micro-structure having two sets of ribbon structures, in accordance with the invention.
Figure 2B:
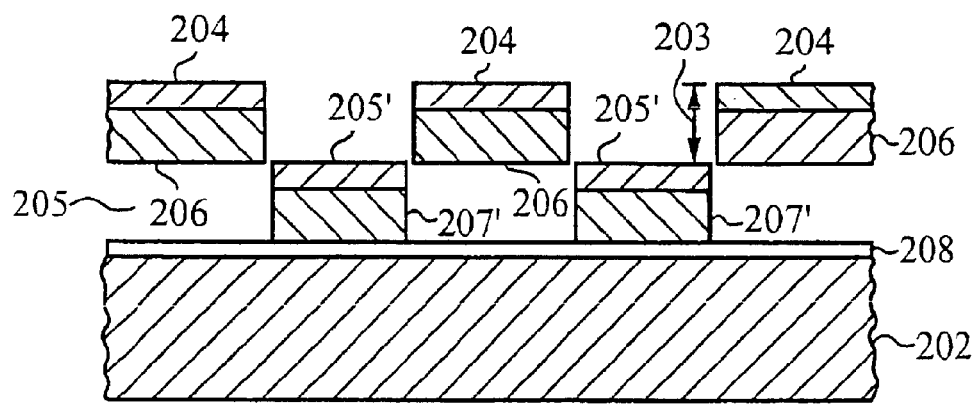

FIGS. 2a–b illustrate cross sectional views of an alternative optical MEM device construction. In accordance with this construction, the optical MEM device has at least two sets of alternating ribbons 206 and 207 that are approximately in the same reflective plane. Referring to FIG. 2a, the ribbons 206 and 207 are suspended over a substrate structure 202 by a distance 203. The ribbons 206 and 207 are provided with reflective surfaces 204 and 205, respectively. Preferably, the surface of the substrate 202, or a portion thereof, also has a reflective surface 208. The reflective surfaces of the substrate 208 and the reflective surfaces of the ribbons 204 and 205 are preferably configured to be separated by a distance approximately equal to a multiple of $\lambda/2$ of the impinging light source. Thus, the portion of light that is reflected from the compliment of surfaces 204, 205 and 208 are all in phase, constructively interfere and the maximum intensity is observed. In operation, the flat diffraction optical MEM device alternates between the conditions for constructive and destructive interference by moving the first set of ribbons 206 or the second set of ribbons 207 relative to each other by a distance corresponding to $\lambda$.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient bias voltage across the active ribbon and the substrate to generate Coulombic attractions and/or repulsions between the active ribbons and the substrate.

Now referring to FIG. 2b, when a sufficient bias voltage is applied across the active ribbons 207 and the substrate 202, the ribbons 207 are displaced relative to the bias ribbons 206 by a distance 203 that is approximately equal to a multiple of $\lambda/4$. Accordingly, the portions of light that are reflected from the surfaces 205' of the active ribbons 207 will destructively interfere with the portion of light that is reflected of the surfaces 204 of the bias ribbons 206. It will be clear to one skilled in the art that an optical MEM device may be configured to modulate an incident light source with a wavelength $\lambda$ in other operative modes. For example, both sets of ribbons 206 and 207 may be configured to move and separate by multiples of $\lambda/4$ in order to alternate between the conditions for constrictive and destructive interference.

The ribbons of the MEM devices, described in FIGS. 1a–b and FIGS. 2a–b are preferably hermetically sealed within a die structure. Methods and materials used for providing a hermetically sealed die are described in the U.S. patent application Ser. No. 09/124710, filed Jul. 29, 2001, entitled "METHOD OF AND APPARATUS FOR SEALING AN HERMETIC LID TO A SEMI CONDUCTOR DIE", now U.S. Pat. No. 6,303,986, the contents of which are hereby incorporated by reference.

Figure 3A:
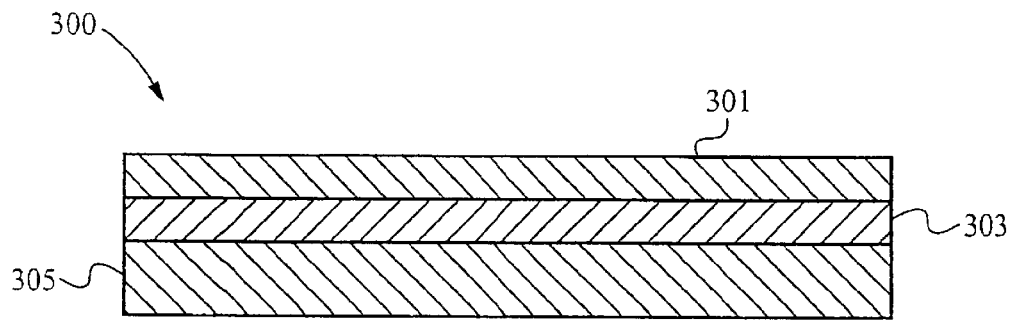
FIG. 3a is a cross-sectional representation of a ribbon structure, in accordance with the invention.

FIG. 3a shows a cross-sectional view of a portion of a micro-structure 300 formed in accordance with the embodiments. The micro-structure 300 has a silicon based underlayer or support layer 305 that is preferably silicon nitride with a thickness in a range of about 800 to about 1200 Angstroms. The micro-structure 300 also has a reflective top-layer 301 that is preferably formed from a metal and has thickness in a range of about 700 to about 1200 Angstroms. The reflective top-layer 301 can be formed from any number of metals and metal alloys, but is preferably formed from aluminum or other metal that can be deposited using sputtering techniques at relatively low temperatures. The reflective top-layer 301 is preferably deposited to a thickness in a range of about 500 to about 1500 Angstroms.

Still referring to FIG. 3a, the micro-structure 300 can also have an oxide layer 303 that is preferably silicon dioxide with a thickness in a range of about 800 to about 1800 Angstroms. The silicon dioxide layer 303 is preferably interposed between reflective top-layer 301 and the under-layer 305. Alternatively, or in addition to the silicon dioxide layer 303, a silicon dioxide layer can be formed below the under-layer 305.

Figure 3B:
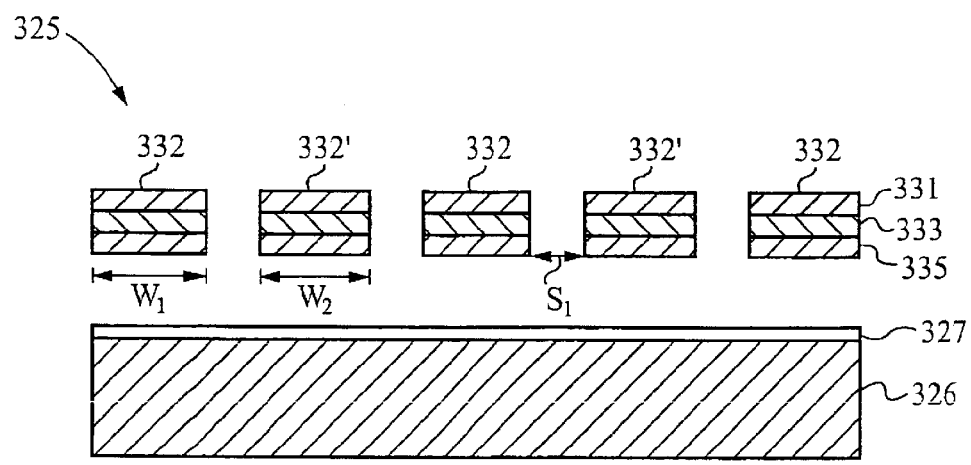

FIG. 3b shows a portion of a micro-device 325, in accordance with the embodiments. The micro-device 325 preferably has a plurality of ribbon structures 332 and 332' geometrically suspended over a substrate 326. Each of the ribbon structures 332 and 332' preferably has a multi-layer structure comprising an under-layer 335, a top-layer 331 and an compensating layer 333, such as those described above. The plurality of ribbons 332 and 332' can comprise an alternating first set of ribbons 332 and second set of ribbons 332' which are moved relative to each other, such as explained above. In accordance with the embodiments, the ribbons 332 and 332' move in opposite direction. In alternative embodiments, one set of the ribbons 332 or 332' moves while the other set of ribbons remains stationary. In yet other embodiments, the micro-device 325 is configured to operate in two or more modes of operation, whereby the micro-device is configured to move one set of ribbons 322 and 322' in one of the modes of operation and both sets of the ribbons 322 and 322' in another of the modes of operation.

The substrate 326 can have a layer 327 of reflective material or any other suitable material to assist in the functionality of the micro-device 325. Also, while the ribbon structures 332 and 332', shown in FIG. 3b, all have uniform widths $W_1$ and $W_2$ and spacings $S_1$, any number of ribbons constructions and arrangements with varied widths $W_1$ and $W_2$ and varied spacings $S_1$ are contemplated. For example, ribbon structure arrangements having varying widths $W_1$ and $W_2$ and optimized spacings $S_1$ are described in U.S. patent application Ser. No. 09/802,619, filed Mar. 8, 2001, entitled "HIGH CONTRAST GRATING LIGHT VALVE", the contents of which is hereby incorporated by reference. Also, while the preferred micro-structure(s) comprise a silicon nitride under-layer, reflective metal top-layer and oxide layer(s), such as silicon dioxide, it is understood that the composition the nitride under-layer, a reflective metal top-layer and a silicon dioxide layer(s) can be varied without departing from the spirit and scope of the embodiments. For example, the reflective metal top-layer may be formed from an alloy and the silicon nitride and silicon dioxide layers can contain impurities and/or dopants such a boron, phosphorus and the like.

Figure 4:
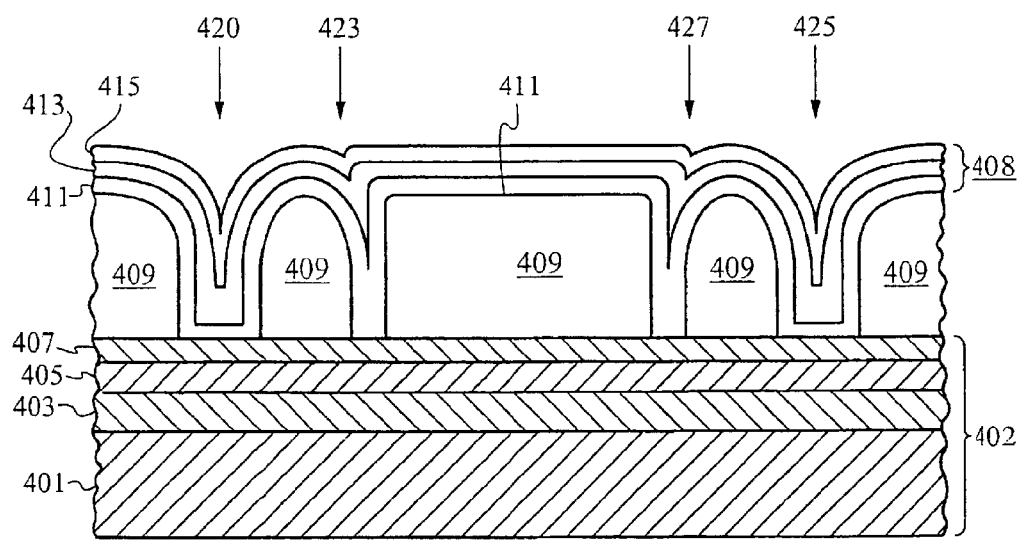
FIG. 4 shows a cross-sectional view of a micro-device with support regions for supporting a ribbon structure near both ends of the ribbon structure, in accordance with the invention.

FIG. 4 illustrates a cross-sectional representation of a micro-device comprising a multi-layer ribbon structure 408, in accordance with a preferred construction. The micro-device comprises a substrate 402, which can comprises a wafer layer 401, and silicon oxide layers 403 and 407, with a poly-silicon layer 405 therebetween. The thicknesses of the layers 401, 403, 405, and 407 are varied depending of the application at hand. However, it is preferable that the oxide layer 407 is present to couple to a ribbon structure 408, as previously described. The ribbon structure 408 preferably comprises a layer of silicon nitride 411, and a layer reflective top layer 415 of aluminum, as previously described. In some applications, a layer of silicon oxide 413, with a layer thickness in a range of about 500 to about 2000 Angstrom, can be provided to reduce strain between the silicon nitride layer 411 and the reflective top layer 415.

Still referring to FIG. 4, the ribbon structure 408 is preferably suspended over the substrate structure 402, such that there is one or more gaps 409 between the ribbon structure 408 and the substrate structure 402. Preferably, the ribbon structure 408 is supported to or couples to the substrate structure 402 through anchor support features 420 and 425 and post support features 423 and 427, as previously described, wherein an anchor support features and a plurality of post support features support each end of the ribbon structure 408.

Figure 5A:
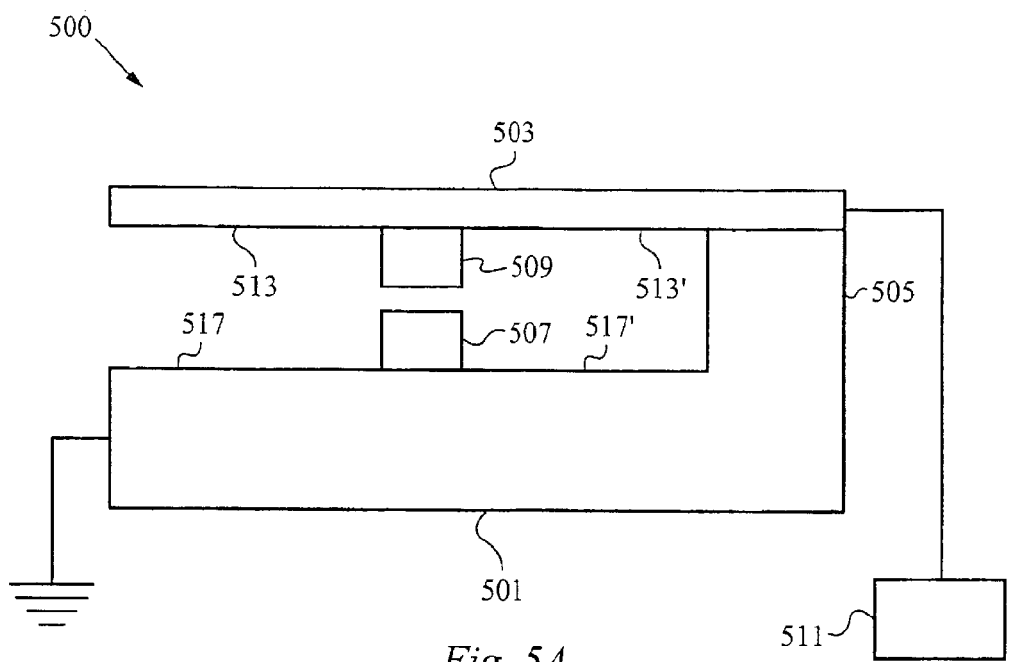
FIGS. 5a–b show a cantilever micro-structure configured to contact a substrate, in accordance with the invention.

Referring now to FIG. 5a, a device 500 in accordance with the embodiments of the invention comprises a movable micro-structure 503. The micro-structure 503, may be a ribbon, a cantilever, a comb or other movable micro-structure that is suspended over a substrate 501 and coupled to the substrate 501 through one or more support features 505. The substrate 501 comprises a metal-insulator-metal construction, such as described below. The micro-structure 503 has a contact region 509 and one or more non-contact regions 513 and 513'. The substrate also has a contact region 507 and one or more non-contact regions 517 and 517'. In operation, a bias voltage is applied across the micro-structure 503 and the substrate 501 using a driver circuit 511 in electrical communication with the micro-structure 503.

Figure 5B:
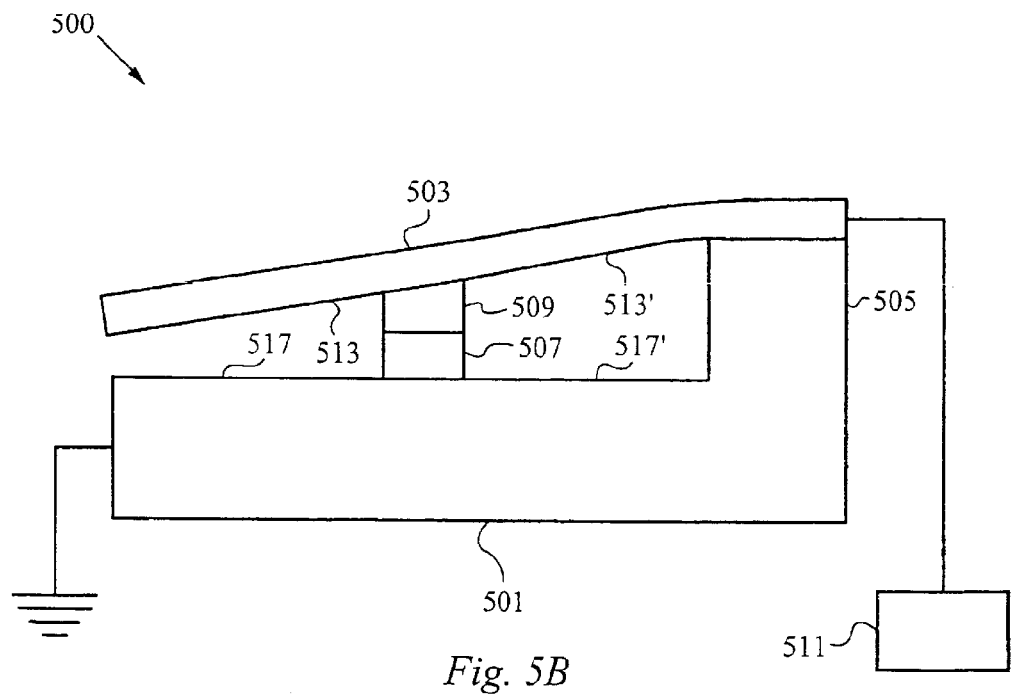

Referring to FIG. 5b, when a sufficient bias voltage (a switching voltage) is applied across the micro-structure 503 and the substrate 501, the micro-structure 503 is deflected towards the substrate 501 and contacts the substrate 501 through the contact regions 509 and 507.

Referring now to FIG. 6a, a device 600 in accordance with the embodiments of the invention comprises a ribbon structure 603 and a substrate 601 comprises a metal-insulator-metal construction, as described below.

The ribbon structure 603 is preferably suspended over the substrate 601 and is coupled to the substrate 601 through support features 604 and 605 at or near the ends of the ribbon structure 603. The ribbon structure 603 is preferably a multi-layer structure comprising a layer of silicon nitride, a reflective top layer of aluminum and a conductive under layer of titanium nitride, as described below.

The ribbon structure 603 and the substrate 601 have contact regions 609 and 607, respectively. In operation, a sufficient bias voltage is applied across the ribbon structure 603 using a driver circuit 611 in electrical communication with the ribbon structure 603, such that the active portion of the ribbon structure 603 is deflected toward the substrate 601 and makes contact with the substrate 601 through the contact regions 609 and 607, as shown in FIG. 6b.

In accordance with the embodiments of the invention, a device comprises an array of ribbon structures, wherein a first set of the ribbons are configured to move relative to a second set of ribbons to modulate a light source with one or more wavelengths in a range of about 300 to about 3000 nanometers, as explained above.

Figure 7A:
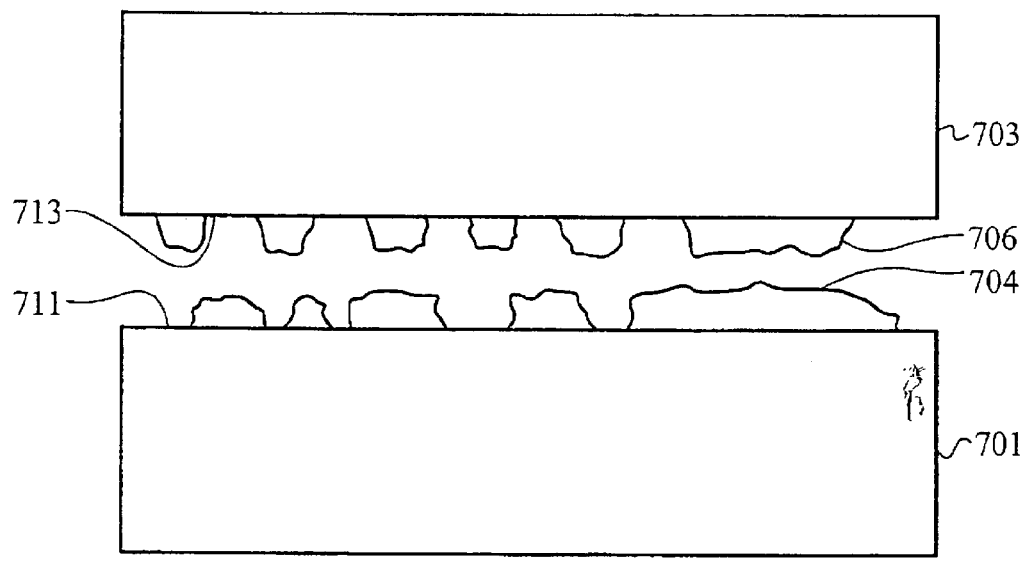
FIGS. 7a–b show the formation asperities on contact surfaces.
Figure 7B:
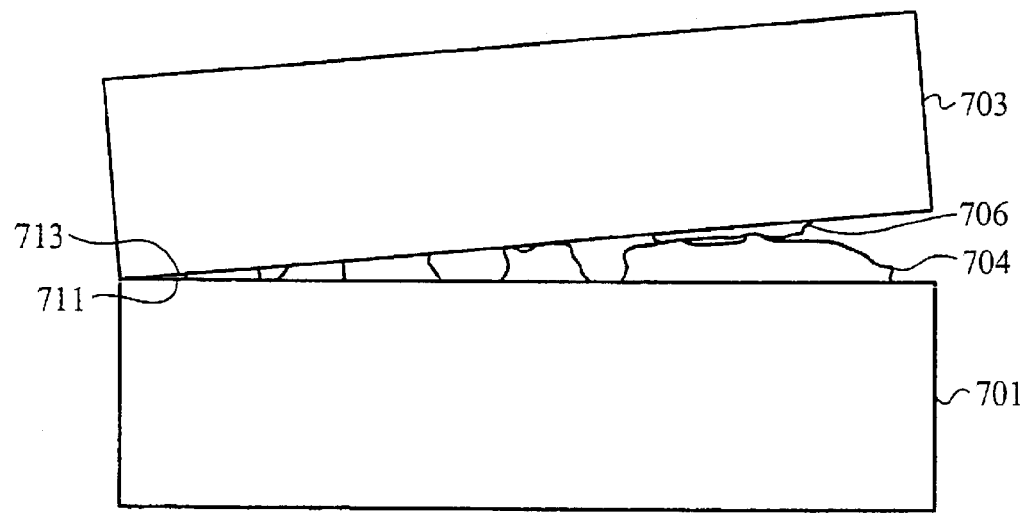

FIGS. 7a–b illustrate a pair of contact regions 701 and 703, that represent contact regions of a micro-structures and a substrate, as described above. In conventional approaches, the surfaces 711 and 713 of the contact regions 701 and 703 are at different potentials during the operation of the device. Because the surfaces 711 and 713 of the contact regions 701 and 703 operate at different potentials, there is a propensity for small welding spots or asperities 704 and 706 to form on the surfaces 711 and 713. As the asperities 704 and 706 are formed on the surfaces 711 and 713, the surfaces 711 and 713 have a propensity to stick together and/or can not be contacted in a controlled and/or reproducible manner Now referring to FIG. 8, in order to solve aforementioned problems with contact MEM devices, a device 800 in accordance with the embodiments of the invention, has one or more micro-structures 802 suspended over a substrate 801. The substrate 801 includes a metal-insulator-metal construction 806 comprising a lower metal layer 821 and an upper metal layer 825 with the insulator layer 823 sandwiched therebetween. In a preferred embodiment, the substrate 801 has a metal-insulator-metal construction 806 comprising titanium nitride metal layers 821 and 825 and a silicon oxide insulator layer 823.

Figure 8:
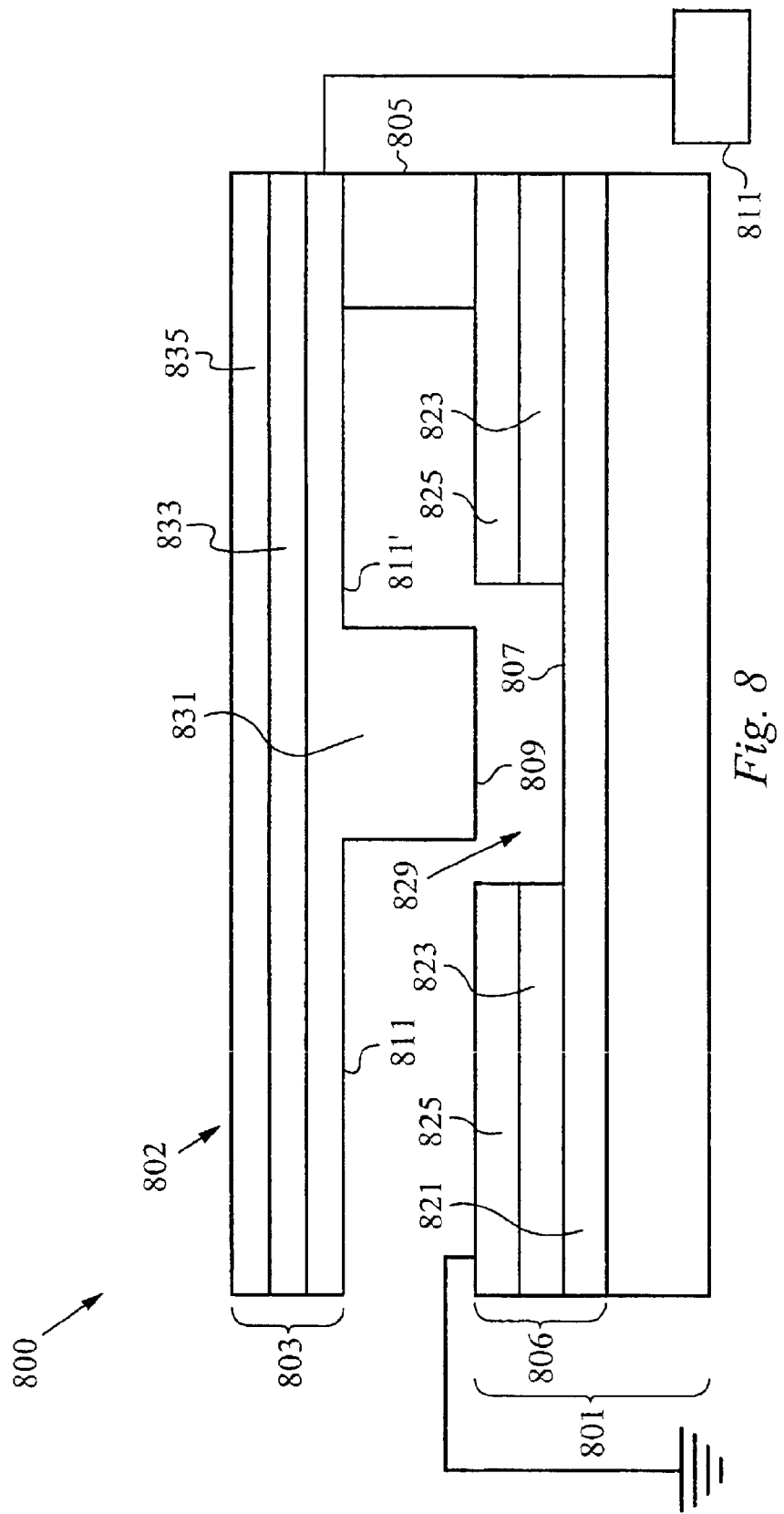
FIG. 8 shows a micro-device with a metal-insulator-metal construction, in accordance with the invention.

Still referring to FIG. 8, the upper metal layer 825 and the insulator layer 823 are preferably patterned with a contact via 829 to expose a portion of the lower metal layer 821 and provide a region 807 for contacting a complimentary region 809 on the under side of the micro-structure 802. The contact region 809 of the micro-structure 802 preferably protrudes, as shown, such that the contact region 809 inserts into the via 829 patterned through the upper metal layer 825 and the insulator layer 823.

The micro structure 802 has at least one metal layer 831 on the under side of the micro-structure 802. The metal under layer 831 forms the contact region 809 and non-contact regions 811 and 811'. In accordance with the embodiments of the invention, the micro-structure 802 has a metal-insulator-metal construction 803. Preferably, the metal-insulator-metal construction 803 comprises an under layer 831 of titanium nitride and top layer 835 of aluminum and a silicon nitride-based layer 833 sandwiched therebetween.

In operation, a bias voltage is applied across the micro-structure 802, or micro-structures, and the upper metal layer 825 of the substrate 801 with a driver circuit 811 coupled to the micro-structure 802 and the lower metal layer 821. The Culombice attraction between the micro-structure 802 and the upper metal layer 825 causes the micro-structure 802 to move towards the substrate 801 and contact the substrate 801 through the contact regions 807 and 809, such as shown in FIG. 5b and FIG. 6b. Because the potential difference between the contact regions 807 and 809 is minimized, or reduced, the formation of asperities and/or sticking is also minimized, or reduce.

Figure 9:
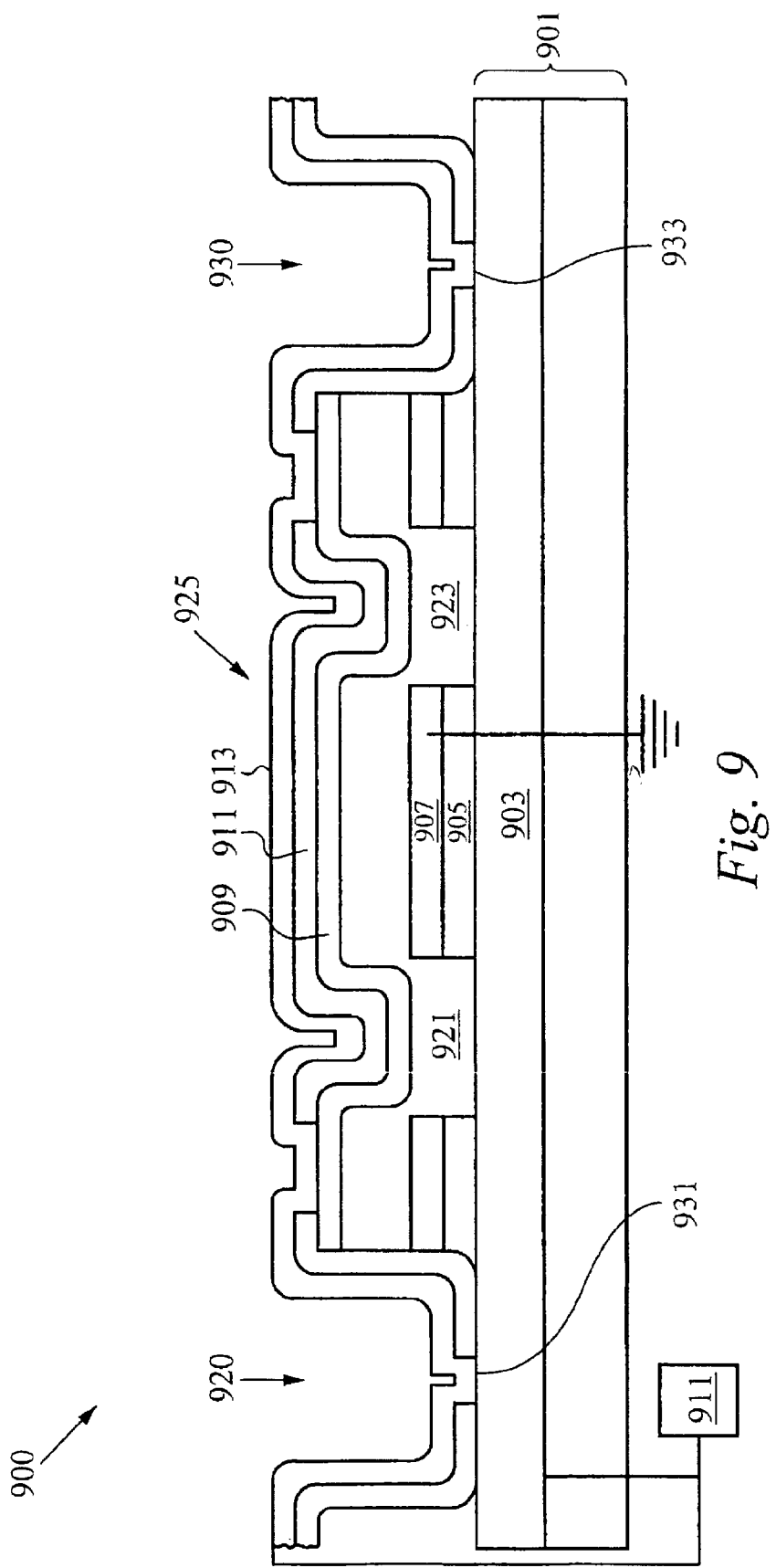
FIG. 9 shows a ribbon micro-structure with a metal-insulator-metal construction, in accordance with the invention

FIG. 9 shows a cross-sectional view of an optical MEM device 900 comprising a ribbon 925, configured to modulate light in accordance with the embodiments of the invention. Preferably, the device 900 comprises a plurality of ribbons (not shown) with a first set of the ribbon configured to move relative to a second set of ribbons for modulating light, as described above.

Still referring to FIG. 9, the substrate 901 comprises a metal-insulator-metal construction. The metal insulator-metal construction preferably comprises a lower metal layer 903 and an upper metal layer 907 formed from titanium nitride with an insulator layer 905 of silicon oxide sandwiched therebetween. The preferred thicknesses of the layers 903, 905 and 907 depends on the intended application, but are preferably in a range of about 500 to about 4000 Angstroms thick.

Still referring to FIG. 9, the upper metal layer 907 and the insulator layer 905 are fashioned with vias 921 and 923 such that contact regions on the surface of the lower metal layer 903 are exposed. The vias 921 and 923 provide gaps between the contact surfaces of the ribbon 925 and the substrate 901, through which the ribbon 925 and the lower metal layer 903 make contact during operation. The vias 921 and 923 are formed by selectively depositing the insulator layer 905 and the top metal layer 907, by using suitable etching processes and/or a combination thereof.

Still referring to FIG. 9, the ribbon 925 also comprises a metal-insulator-metal construction. The ribbon 925, for example, comprises a metal under layer 909, that is preferably formed from titanium nitride. The ribbon also comprises a metal top layer 913, that is preferably formed from aluminum. Sandwiched between the metal under layer 909 and the metal top layer 913, is an insulator layer 911 that is preferably formed from silicon nitride, silicon-oxide or a combination thereof. The preferred thicknesses of the ribbon layers 909, 911 and 913 depend on the intended application, but are preferably in a range of about 200 to about 2000 Angstroms thick.

In operation, a bias voltage is applied to the metal layers 909 and 913 of the ribbon 925 and the lower metal layer 903 of the substrate 901 with a driver circuit 911 urging the ribbon 925 to deflect toward the substrate 901 and contact the substrate 901 through the vias 921 and 923, while an adjacent ribbon (not shown) remains substantially stationary. The contact regions of the ribbon 925 preferably protrude to fit into the vias 921 and 923, as shown. The ribbon 925 is preferably coupled to the substrate through support features 920 and 930 attached to the substrate 901 through coupling regions 931 and 933.

FIGS. 10a–e will be used to illustrate the formation a micro-structure on a substrate 156 comprising a wafer layer 152 and a patterned metal-insulator-metal layer 155, as described above. The wafer layer 152 can comprise silicon dioxide, silicon nitride and poly-silicon, doped, un-doped silicon or any combination thereof The patterned metal-insulator-metal layer 155 is preferably patterned with contact vias 912 and 923 and a plurality of coupling regions 931 and 933, shown in FIG. 9. FIGS. 10a–e are used to illustrate the formation of a single support structure. However, it is understood that the method described can be used to form any number of support structures. In fact, ribbon structures are preferably supported through several support structures positioned near or at the ends of the ribbon structures.

Figure 10A:
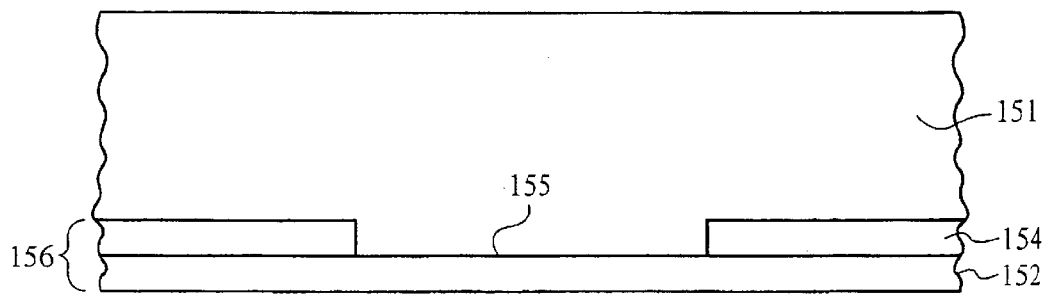
FIGS. 10a–e show forming support features, in accordance with the method of the invention.
Figure 10B:
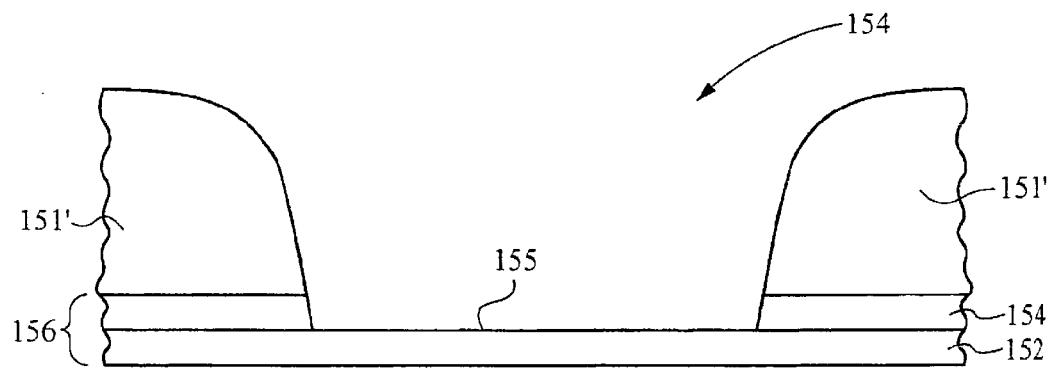
Figure 10C:
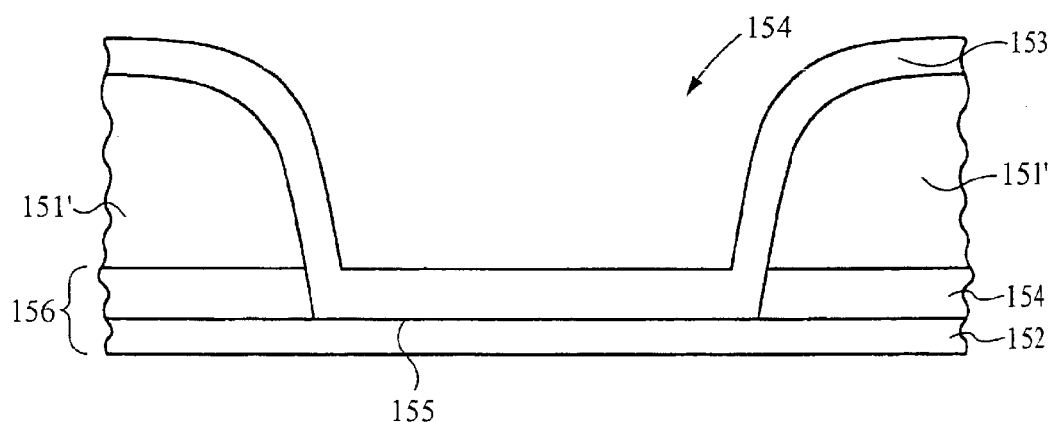

Referring now to FIGS. 10a–c, a layer 151 of sacrificial material, such as poly-silicon, is deposited over the patterned metal-insulator-metal layer 154 and the coupling region 155. The sacrificial layer 151 is etched to form a patterned sacrificial layer 151' having a support trench 154 and exposing the support region 155 on the wafer layer 152. After the support trench 154 is formed, the device layer 153 is formed over the patterned sacrificial layer 151' such that a portion of the device layer 153 couples to the wafer layer 152 through the support region 155. The device layer 153 preferably comprises a layer of titanium nitride, silicon nitride and aluminum, as described above, and can also comprises one or more layers of silicon oxide.

Figure 10D:
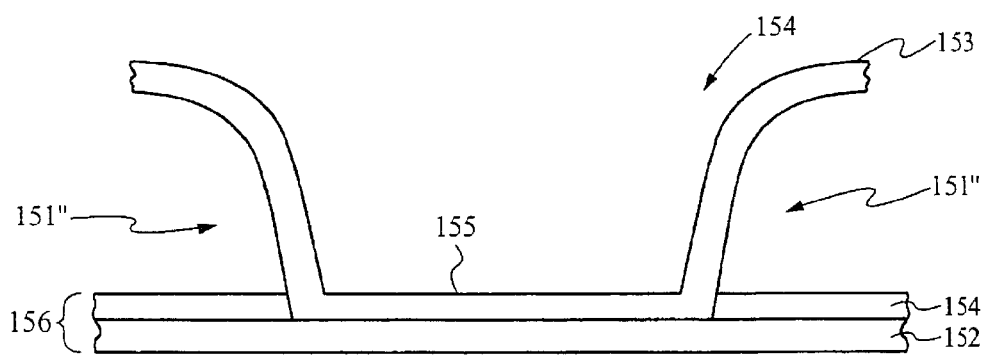

Now referring to FIG. 10d, after the device layer 153 is formed, then the patterned sacrificial layer 151' is etched away to form voids 151" and release portions of the device layer 153, while portions of the device layer 153 remains coupled to the wafer layer 152 through the support region 155. Preferably, the sacrificial layer 151' is etched using a dry etch process, such as described in the U.S. patent application Ser. No. 09/952,626, entitled MICRO- ELECTRONIC MECHANICAL SYSTEM AND METHODS, filed Sep. 13, 2001, the contents of which are hereby incorporated by reference.

Figure 10E:
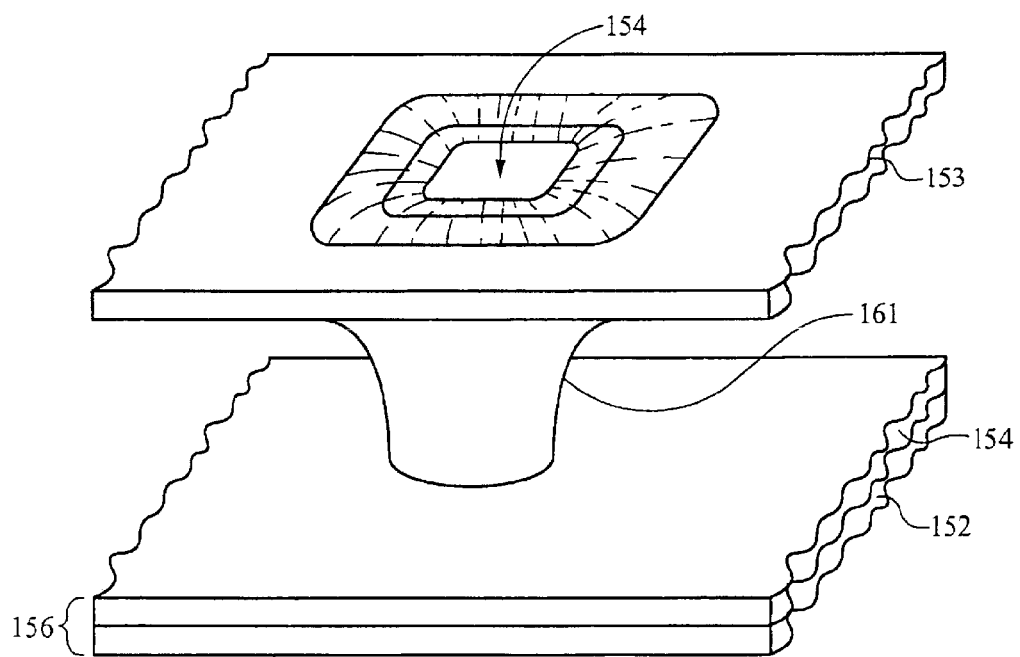

In a preferred method of the invention, the device layer 153 is cut or divided into ribbon structures prior to etching the sacrificial layer 151', whereby each ribbon structure remains coupled to the substrate layer 152 through a plurality of support features 161, such as the one shown in FIG. 10e.

The present invention provides for a MEM device and/or an optical MEM device which operates in a contact manner, but which has reduced formation asperities formation on and/or sticking of contacting parts. The present invention has been described in terms of specific embodiments incorporating details to facilitate the understanding of the principles, construction and operation of the invention. While the MEM device is an optical MEM device, other MEM devices, including cantilever devices and oscillator devices are contemplated. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A device comprising a micro-structure suspended over a substrate, the micro-structure comprising contact regions and non-contact regions on a same layer and the substrate comprising contact regions and non-contact regions, the micro-structure being configured to move relative to the substrate by applying a bias voltage between the micro-structure and the non-contact regions of the substrate while maintaining a constant voltage between the micro-structure and the contact regions of the substrate.

2. The device of claim 1, wherein the insulator layer comprises an oxide.

3. The device of claim 1, wherein at least one of the metal layers comprises titanium nitride.

4. The device of claim 1, wherein the micro-structure comprise an insulator layer sandwiched between metal layers.

5. The device of claim 4, wherein at least one of the metal layers comprises titanium nitride.

6. The device of claim 4, wherein at least one of the metal layers comprises aluminum.

7. The device of claim 1, wherein the micro-structure is a ribbon structure.

8. An optical MEM device comprising:

a. means to modulate light, the means comprising ribbons suspended over metal-insulator-metal substrate; and b. means to move a first set of the ribbons relative to a second set of the ribbons, wherein one of the first and second set of ribbons and the substrate contact through contact regions that have substantially the same potential.

9. The optical MEM device of claim 8, wherein the ribbons comprise metal layers of titanium nitride and aluminum.

10. The optical MEM device of claim 9, wherein the ribbons comprise a layer of silicon-nitride sandwiched between the layers of titanium nitride and aluminum.

11. The optical MEM device of claim 8, wherein metal-insulator-metal substrate, comprises metal layers of titanium nitride and an insulator layer of oxide.

12. The optical MEM device of claim 8, wherein the means for moving the first set of the ribbons relative to the second set of the ribbons comprises a circuit configured to apply a bias voltage across an upper metal layer of the metal-insulator-metal substrate and the one of the first set and second set of the ribbons.

13. The optical MEM device of claim 12, wherein the regions of contact correspond to portions of a metal under layer on the one of the first set and the second set of the ribbons and a lower metal layer of the metal-insulator-metal substrate.

14. The optical MEM device of claim 13, wherein the regions of contact comprise titanium nitride.

* * * * *

UNITED STATES PATENT AND TRADEMARK OFFICE
CERTIFICATE OF CORRECTION

PATENT NO. : 6,813,059 B2
DATED : November 2, 2004
INVENTOR(S) : Hunter et al.

It is certified that error appears in the above-identified patent and that said Letters Patent is hereby corrected as shown below:

Column 9,
Lines 26-27, after "over a", insert -- metal-insulator-metal --

Signed and Sealed this

First Day of February, 2005

JON W. DUDAS
*Director of the United States Patent and Trademark Office*